(12) United States Patent
Hata et al.

(10) Patent No.: US 7,991,251 B2
(45) Date of Patent: Aug. 2, 2011

(54) OPTICAL MODULE MOUNTED WITH WDM FILTER

(75) Inventors: Shohei Hata, Yokohama (JP); Naoki Matsushima, Yokohama (JP); Toshiaki Takai, Yokohama (JP); Yukio Sakigawa, Fujisawa (JP); Satoshi Arai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/494,890

(22) Filed: Jun. 30, 2009

(65) Prior Publication Data

US 2010/0002987 A1 Jan. 7, 2010

(30) Foreign Application Priority Data

Jul. 2, 2008 (JP) ................... 2008-172896
Sep. 5, 2008 (JP) ................... 2008-227747

(51) Int. Cl.
*G02B 6/28* (2006.01)
*G02B 6/30* (2006.01)

(52) U.S. Cl. ............... 385/24; 385/39; 385/49; 385/50

(58) Field of Classification Search .................. None
See application file for complete search history.

(56) References Cited

U.S. PATENT DOCUMENTS

| 6,085,000 A * | 7/2000 | Tanaka et al. ............ 385/45 |
| 6,219,470 B1 * | 4/2001 | Tu ............................. 385/14 |
| 7,308,174 B2 * | 12/2007 | Fukuyama et al. ......... 385/49 |
| 7,352,932 B1 * | 4/2008 | Chang et al. ............... 385/37 |
| 7,447,400 B2 * | 11/2008 | Yokino et al. ............. 385/18 |
| 2002/0012172 A1 | 1/2002 | Steinberg et al. |
| 2002/0080457 A1 | 6/2002 | Nakanishi et al. |
| 2003/0044119 A1 * | 3/2003 | Sasaki et al. ............... 385/49 |
| 2003/0123819 A1 | 7/2003 | Nakanishi et al. |
| 2004/0042728 A1 * | 3/2004 | Ito et al. ..................... 385/49 |

FOREIGN PATENT DOCUMENTS

| EP | 0 908 746 A2 | 4/1999 |
| JP | 2003-232965 A | 8/2003 |
| JP | 2004-294513 A | 10/2004 |
| JP | 2005-157136 A | 6/2005 |
| JP | 2005-249966 A | 9/2005 |
| JP | 2005-316291 A | 11/2005 |
| JP | 2006-71739 A | 3/2006 |
| JP | 2007-17903 A | 1/2007 |

* cited by examiner

*Primary Examiner* — Tina M Wong
(74) *Attorney, Agent, or Firm* — Mattingly & Malur, PC

(57) ABSTRACT

A filter element includes a first glass substrate having a pair of parallel surfaces and a band pass filter arranged on one of the parallel surfaces, a pair of single-crystal substrates (Si wafers) each including a primary surface formed with a depression having an inclined surface with respect to the primary surface occupying at least one half of the opening of the depression, and a second glass substrate having an optical element. The primary surfaces of the single-crystal substrate pair are bonded to a pair of the surfaces of the glass substrate. The depressions are faced through the glass substrate and surround the band pass filter. By this configuration, the filter element can be mass produced with a high accuracy and a low cost by the wafer-level process.

18 Claims, 9 Drawing Sheets

OPTICAL MODULE MOUNTED WITH WDM FILTER

INCORPORATION BY REFERENCE

The present application claims priorities from Japanese applications JP-A-2008-172896 filed on Jul. 2, 2008, JP-A-2008-227747 filed on Sep. 5, 2008, the contents of which are hereby incorporated by reference into this application.

BACKGROUND OF THE INVENTION

This invention relates to an optical module for communication, or in particular, to a filter suitable for an optical communication system of WDM (Wavelength Division Multiplexing) scheme and an optical module using the filter.

In recent years, the internet has increased in speed to such an extent that the access network from each home is also required to be adapted to the high-speed optical communication. As a module for optical communication for access, a transmit/receive module such as the planar waveguide optical module or a combination of CAN (Controller Area Network) modules has been used. In the planar waveguide optical module, one waveguide is arranged at the first end thereof being optically coupled with an optical fiber. This waveguide is separated into at least two waveguides midway. A light-emitting element is mounted at the second end of the first waveguide, while a light-receiving element is mounted at the second end of the second waveguide. A band pass filter is inserted as required midway of these waveguides. This structure makes it possible to produce a transceiver which transmits a signal from the light-emitting element and receives an optical signal from a base station through the light-receiving element.

In a combination of the CAN modules, on the other hand, a fiber is fixed on a housing of a metal or the like, and the optical signal from the fiber is sent to the receiving end through an optical path switching element, while the optical signal from the light-emitting element at the transmitting end is sent to the fiber through the optical path switching element. At the receiving end, a CAN module mounted with a light-receiving element is arranged to receive the optical signal from the base station. At the transmitting end, on the other hand, a CAN module packaged with the light-emitting element is arranged. In both cases, a band pass filter is arranged midway of the optical path as required. By doing so, a transmit/receive module for optical communication can be produced.

Also, in recent years, there have been developed a WDM filter, in which a band pass filter is formed on a surface of one optical part such as a prism and an optical signal transmitted by this band pass filter is separated from the optical signal received from the base station, and a module having the transmit/receive functions integrated in a single CAN module using the WDM filter.

The WDM filter and the optical communication module using it are described, for example, in the following seven references. First, JP-A-2003-232965 discloses as an example of the planar waveguide-type optical module, a structure mounted with a light-receiving element at an end of a planar waveguide and a packaged structure of an amplifier element. JP-A-2006-71739, on the other hand, discloses a structure of a filter arranged midway of a planar waveguide to separate the input/output signals of a laser diode (hereinafter referred to as LD) and a photodiode (hereinafter referred to as PD). JP-A-2005-316291 discloses a module structure for multiplexing optical signals using a WDM filter. JP-A-2007-17903 discloses a transmit/receive module combined with a CAN-packaged light receiving module to transmit the light from the LD and receive the light from the base station through an optical path switching element. JP-A-2004-294513 discloses a transmit/receive module in which the LD and the PD are mounted in a single CAN-packaged module together with an optical filter, and coupled to an optical fiber external to the module through an optical filter. JP-A-2005-157136 discloses a structure in which a band pass filter is formed on a surface of a prism as a WDM filter. JP-A-2005-249966 discloses a structure forming a high isolation degree WDM filter by combining filters of dielectric multilayer films.

SUMMARY OF THE INVENTION

In recent years, however, the number of wavelengths of the analog or digital optical signal transmitted or received by an optical module has increased from the conventional two wavelengths to three or more wavelengths. In the optical module, a light-emitting element transmits, for example, an optical signal of 1.3 μm in wavelength on the one hand, while a light-receiving element is required to receive two types of optical signals 1.48 μm and 1.55 μm in wavelength on the other hand. Therefore, a single optical module is required to transmit and receive three or more optical signals of different wavelengths. To provide the aforementioned conventional planar waveguide-type optical module having this function, a band pass filter is required to be inserted midway of the waveguide in accordance with each wavelength, often posing the problem of increased cost due to a loss at the portion where the band pass filter is fixedly bonded or the complicated works of fixedly bonding the filter. Also, in the case where a transceiver is fabricated by combining CAN modules, there is concern that the cost increases due to an increased number of elements such as a housing for mounting the CAN modules, an optical path switching element inserted midway of the optical path and a band pass filter.

In a configuration suitable to solve the aforementioned problem without increasing the cost, a band pass filter is formed on a prism, and a LD and a PD are mounted in a single CAN module to form a transmit/receive module. The structure disclosed in JP-A-2004-294513 is adapted to up to two wavelengths but is not applicable to an optical module using three or more wavelengths.

Further, with an increase in the number of optical elements mounted in the CAN module, the band pass filters are required to be mounted correspondingly. In packaging optical elements, however, the angle and the positional accuracy are important factors and adjustment for them is required to be minimized. If a structure, in which the optical elements are mounted on a flat surface as far as possible and the element including the planar band pass filters are arranged on the optical elements, can be implemented, at least the tilt adjustment can be omitted and the packaging process can be simplified remarkably.

Also, the optical elements and the band pass filters can be packaged at a still lower cost by mounting the LD and the PD on a substrate in the wafer state and the band pass filters in a plane thereon.

In order to solve the problem described above, the object of this invention can provide an optical module as described below.

According to one aspect of the invention, there is provided an optical module comprising a filter wherein an optical filter is formed of a dielectric multilayer film on one or both of the two parallel primary surfaces of a glass substrate, wherein single-crystal substrates such as Si wafers are bonded from above and below the glass substrate on at least a portion other than the area formed with the optical filter, wherein a surface of the Si wafer facing the optical filter is formed with an inclined surface by etching in such a manner that the etched surface of the Si wafer above the glass substrate is parallel to the etched surface of the Si wafer under the glass substrate, and wherein the each surface of the Si wafers bonded above and under the glass substrate which is opposed to the primary surface of the Si wafer is a mirror surface parallel to the primary surface of the glass substrate. The optical filter is a member exhibiting a high transmittance to a specified wavelength or wavelength range, and a band pass filter is an example thereof.

According to another aspect of the invention, there is provided an optical module wherein the glass substrate and the Si wafers are bonded to each other by anodic bonding.

According to still another aspect of the invention, there is provided an optical module comprising another substrate bonded to the filter part, wherein a light-emitting element or a light-receiving element is mounted on the substrate, and set in position for each wavelength at a point where light enters or exits from the filter part.

According to a further aspect of the invention, there is provided an optical module, wherein the substrate is in the form of wafer which is not individualized, wherein a light-emitting element or a light-receiving element is mounted on the substrate and then bonded with the filter part in the wafer state before the individualization, the optical module being formed by dicing into parts each including a filter part, optical elements and the substrates.

According to a still further aspect of the invention, there is provided an optical module wherein a light-emitting element or a light-receiving element is mounted on the substrate in the wafer state using die bonding with thin-film solder or flip-chip connection.

A typical structure of the filter element and the optical module having the filter element according to this invention is described below with reference numerals shown in the drawings.

Filter element 1: It includes a glass substrate (1) having a first primary surface and a second primary surface opposed to the first primary surface with optical filters (4, 6) provided on a part of the first primary surface, and a pair of single-crystal substrates (2, 3) each having a primary surface bonded to one of the first and second primary surfaces of the glass substrate (1), in which depressions are formed with (20, 30) on the primary surfaces at a distance from the edges thereof, wherein the depression (20, 30) formed on each of the pair of the single-crystal substrates (2, 3) has a surface (21, 31) inclined with respect to the primary surface of the single-crystal substrate (2, 3), wherein the single-crystal substrate (3) surrounds an optical filters (4, 6) with the opening of the depression (30), and the optical filters (4, 6) are bonded to the first primary surface of the glass substrate (1) through a gap in such a manner that the optical filters (4, 6) face the inclined surface (31) of the depression (30), and wherein the single-crystal substrate (2) is bonded to the second primary surface of the glass substrate (1) in such a manner that the optical filters (4, 6) face the inclined surface (21) of the depression (20) through the glass substrate (1).

Filter element 2: Based on the filter element 1, each of the single-crystal substrates (2, 3) is a silicon substrate.

Filter element 3: Based on the filter element 2, the inclined surface (21, 31) of the depression (20, 30) formed on each of the single-crystal substrate (2, 3) constitutes the (111) crystal plane of the silicon substrate.

Filter element 4: Based on the filter element 1, the single-crystal substrates (2, 3) are bonded by anodic bonding to the glass substrate (1) at the periphery of each primary surface thereof.

Filter element 5: Based on the filter element 4, the periphery of the primary surface of the single-crystal substrates (2, 3) is separated into a pair of peripheral parts at a distance from each other by the depression (20, 30) formed on the primary surface.

Filter element 6: Based on the filter element 4, the periphery of the primary surface of the single-crystal substrate (2, 3) surrounds the depression (20, 30) formed on the primary surface.

Filter element 7: Based on the filter element 1, each of the optical filters (4, 6) is formed of a dielectric multilayer film integrated on the first primary surface of the glass substrate (1).

Filter element 8: Based on the filter element 1, the second primary surface of the glass substrate (1) is provided with a total reflection film (5) or another optical filter (12) than the optical filters (4, 6) in opposed relation, through the glass substrate (1), to the optical filters (4, 6) provided on the first primary surface of the glass substrate (1).

Filter element 9: Based on the filter element 1, the inclined surface (21, 31) of the depression (20, 30) formed on the single-crystal substrate (2, 3) extends from a first side (21a, 31a) nearest to the primary surface of the single-crystal substrate (2, 3) toward a second side (21b, 31b) on a opposite side of the first side (21a, 31a) in the direction crossing the side (21a, 31a) in such a manner that the distance between the inclined surface (21, 31) and the primary surface of the single-crystal substrates (2, 3) increases in the direction along of thickness of the single-crystal substrate (2, 3) progressively with approaching the side (21b, 31b).

Filter element 10: Based on the filter element 9, the pair of the single-crystal substrates (2, 3) are bonded to the glass substrate (1) in such a manner that the inclined surfaces (21, 31) are opposed to each other through the glass substrate (1) and the directions of the extension between the side (21a, 31a) and the side (21b, 31b) reverse to each other.

Filter element 11: Based on the filter element 10, the side (31a) of the inclined surface (31) of the first single-crystal substrate (3) is opposed to the inclined surface (21) of the second single-crystal substrate (2) through the glass substrate (1), and the side (21a) of the inclined surface (21) of the second single-crystal substrate (2) is opposed to the inclined surface (31) of the first single-crystal substrate (3) through the glass substrate (1).

Filter element 12: Based on the filter element 11, the second primary surface of the glass substrate (1) is provided with a total reflection film (5) or another optical filter (12) than the optical filters (4, 6), wherein the total reflection film (5) or another optical filter (12) (FIG. 9) is arranged facing the inclined surface (31) of the first single-crystal substrate (3) bonded to the first primary surface of the glass substrate (1) through the glass substrate on the one hand, and spaced from the area of the second primary surface of the glass substrate (1) which is opposed to the side (31a) of the inclined surface (31) in the direction of extension of the inclined surface (31), on the other hand.

Filter element 13: Based on the filter element 12, the first end of the optical filters (4, 6) arranged on the first primary surface of the glass substrate (1) is arranged spaced from the side (31a) of the inclined surface (31) of the first single-crystal substrate (3) bonded to the first primary surface of the glass substrate (1) along the aforementioned direction of extension of the inclined surface (31), and extended along the direction of extension from the first end of the optical filters (4, 6). At the same time, the first end of the optical filters (4, 6) is projected toward the side (31*a*) of the inclined surface (31) beyond the total reflection film (5) or the another optical filter (12) arranged on the second primary surface of the glass substrate (1).

Optical module 1: Comprising the filter element described in Filter element 1, a base substrate (16) fixed on the second primary surface distant from the first primary surface of the single-crystal substrate (3) and a plurality of optical elements (38 to 40) arranged on the package surface of the base substrate (16) opposed to the first single-crystal substrate (3), wherein a plurality of the optical elements (38 to 40) are arranged along the direction from the side (31*a*), nearest to the glass substrate (1), of the inclined surface (31) of the first single-crystal substrate (3) to the farthest side (31*b*) from the glass substrate (1).

Optical module 2: Based on the optical module 1, one of the plurality of the optical elements (38 to 40) which is nearest to the side (31*a*) of the inclined surface (31) of the first single-crystal substrate (3) is a light-emitting element (38), and the other optical elements are light-receiving elements (39 to 40).

Optical module 3: Based on the optical module 1, the optical filter is separated into at least two areas (4, 6) having different ranges of transmissive wavelengths along the direction of extension of the inclined surface (31) of the first single-crystal substrate (3), and the optical elements (38 to 40) are arranged at positions corresponding to the areas (4, 6) of the optical filter on the package surface of the base substrate (16).

Optical module 4: Based on the optical module 1, a spacer (14) is bonded to the package surface of the base substrate (16), in which the spacer (14) is bonded to the second primary surface of the first single-crystal substrate (3) thereby to fix the plurality of the optical elements (38 to 40) on the second primary surface of the first single-crystal substrate (3) facing it with a space.

The typical process flow of the fabrication method of the optical module according to the invention is described below with reference numerals in the drawings described later.

Fabrication method 1: First to six steps are sequentially executed as described below.

A first step for preparing a pair of wafers of a single-crystal material each having a first crystal plane of closest packing as a first primary surface and a second crystal plane as a second primary surface inclining at a predetermined angle to the first crystal plane;

a second step for wet etching one of the primary surfaces of each wafer thereby to form a plurality of etch pits (20, 30) each including the first crystal surface (21, 31) in the one of the primary surface;

a third step for preparing a glass substrate (1) having a first primary surface and a second primary surface opposed to the first primary surface and discretely forming a plurality of optical filters (4, 6) on the first primary surface of the glass substrate (1) in such a manner that they correspond to the plurality of etch pits (30), respectively, formed on one of the primary surfaces of each of the single-crystal wafers;

a fourth step including the step of facing the first single-crystal wafer to the first primary surface of the glass substrate (1) and the second single-crystal wafer to the second primary surface of the glass substrate (1), the step of accommodating the plurality of optical filters (4, 6) formed on the first primary surface of the glass substrate (1) in the plurality of etch pits (30) formed on the first primary surface of the first single-crystal wafer, the step of positioning the single-crystal wafer pair and the glass substrate (1) relatively to each other in such a manner that the openings of the plurality of etch pits (20) formed on the first primary surface of the second single-crystal wafer are superposed at least partially with the openings of the plurality of etch pits (30) formed on the first primary surface of the first single-crystal wafer, through the glass substrate (1), and the step of bonding the first primary surface of the first single-crystal wafer to the first primary surface of the glass substrate (1) and the first primary surface of the second single-crystal wafer to the second primary surface of the glass substrate (1);

a fifth step including the step of preparing a base substrate (16) having a mounting surface on which a plurality of units each including at least two optical elements (38 to 40) are discretely arranged in correspondence with the plurality of etch pits (30), respectively, formed on the first primary surface of the first single-crystal wafer, the step of separating the plurality of units from each other by spacers (14), the step of facing the mounting surface of the base substrate (16) to the second primary surface of the first single-crystal wafer opposed to the first primary surface thereof, and the step of positioning the plurality of units aligned with the plurality of optical filters (4, 6) formed on the first primary surface of the glass substrate (1) thereby to bond the second primary surface of the first single-crystal wafer and the spacers to each other; and a sixth step for cutting the single-crystal wafer pair and the glass substrate (1) together with the spacer (14) to individualize into a plurality of optical modules each having the plurality of optical filters (4, 6) and the corresponding one of the plurality of units.

Fabrication method 2: Based on the fabrication method 1, a single-crystal wafer identical with the single-crystal wafer pair is supplied as the base substrate (16), the method further comprising the aforementioned sixth step for dicing the base substrate (16) together with the single-crystal wafer pair into the plurality of individual optical modules.

Fabrication method 3: Based on the fabrication method 2, the silicon single crystal is used as the material of the single-crystal wafer, and a borosilicate glass base as the material of the glass substrate (1) and the spacers (14).

Fabrication method 4: Based on the fabrication method 1, the at least two optical elements (38 to 40) are fixed on the mounting surface of the base substrate (16) by die bonding with thin-film solder or flip chip connection.

The "optical filter" included in the filter element, the optical module and the fabrication method according to the invention described above is also a member in which the transmittance for at least light having a wavelength (hereinafter referred to as the specified wavelength) or a wavelength range (hereinafter referred to as the specified wavelength range) is higher than the transmittance for light of a wavelength different from the specified wavelength or light in a range other than the specified wavelength range, and also described as a member for selectively transmitting the light of the specified wavelength or in the specified wavelength range. The optical filter preferably has a high reflectivity against what is called "the light not selectively transmitted" including the light of other than the specified wavelength or outside the specified wavelength range. The higher this reflectivity remarkably as compared with the reflectivity of the optical filter against "the light selectively transmitted", the higher the performance of the filter element according to the invention. In order to improve the performance of the filter element according to the invention, the transmittance of the optical filter for "the light not selectively transmitted" is desirably as near to zero as possible. On the other hand, such transmittance is permitted up to an upper limit corresponding to a function (the sensitivity of the light-receiving element, for example) of the optical module having the filter element or the optical communication system incorporating the optical module. The band pass filter is an example of this "optical filter" and can be replaced with an optical element other than the band pass filter in accordance with the function of the optical module or the optical communication system.

According to this invention, an inexpensive optical transmit/receive module can be provided.

Other objects, features and advantages of the invention will become apparent from the following description of the embodiments of the invention taken in conjunction with the accompanying drawings.

DETAILED DESCRIPTION OF THE INVENTION

Embodiments of the invention are explained below with reference to the related drawings. This invention, however, is not limited to these embodiments, and it is easily understood by those skilled in the art that this invention can be variously modified in form and detail without departing from the spirit and scope thereof. This invention, therefore, should not be interpreted as limited to the embodiments illustratively described below.

First Embodiment

Figure 1:
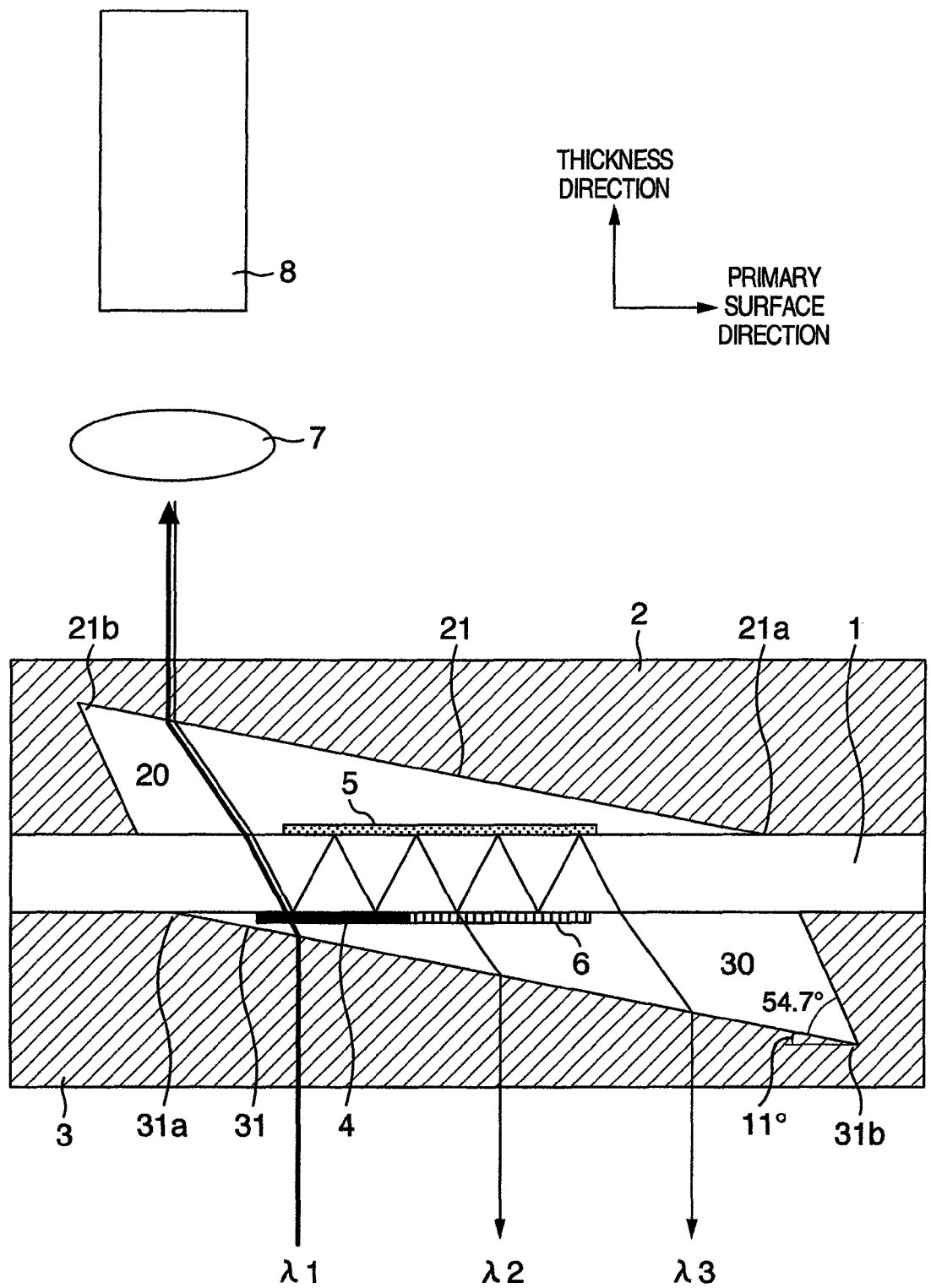
FIG. 1 is a diagram schematically showing the sectional structure of a filter element (spectroscope) according to a first embodiment of the invention.

The filter element and the optical module according to a first embodiment of the invention are explained with reference to FIG. 1. FIG. 1 is a diagram showing the band pass filter (filter element) according to the invention. A pair of the primary surfaces (a pair of the surfaces parallel to each other) of a glass substrate 1 are bonded to the etched primary surfaces (front surfaces) of single-crystal substrates 2, 3, respectively, formed of, for example, silicon (Si). The depressions (also called etch pits) 20, 30 formed by etching the primary surfaces (the surfaces bonded to the glass substrate 1) of the single-crystal substrates 2, 3 each provides, for example, a rectangular opening on the primary surfaces. The opening is located at a distance from the edges or the contour of the primary surface. The primary surfaces of the single-crystal substrates 2, 3 are bonded to the primary surfaces, respectively, of the glass substrate 1 at the "periphery" separating the edges (contour) and the openings of the depressions 20, 30 from each other. The depressions 20, 30 are each formed with a surface extending from the sides 21a, 31a nearest to the openings, respectively, to the farthest sides 21b, 31b in such a direction that the surface crosses the sides 21a, 31a. These surfaces having the longest extension are referred to as the inclined surfaces 21, 31. In the depressions 20, 30 shown in FIG. 1, the sides 21a, 31a of the inclined surfaces 21, 31 are in contact with the periphery of the primary surfaces of the single-crystal substrates 2, 3 surrounding the openings of the depressions 20, 30, while the sides 21b, 31b are located at positions nearer to the edge of the primary surfaces of the single-crystal substrates 2, 3 than the openings of the depressions 20, 30. The sides 21a, 31a of the inclined surfaces 21, 31 are also referred to as "the sides nearest to the primary surfaces of the single-crystal substrates 2, 3" formed with the depressions 20, 30 or "the sides nearest to the primary surfaces of the glass substrate 1" bonded to the primary surfaces of the single-crystal substrates 2, 3. The sides 21b, 31b of the inclined surfaces 21, 31, in contrast, are referred to as "the sides farthest from the primary surfaces of the single-crystal substrates 2, 3" or "the sides farthest from the primary surfaces of the glass substrate 1" bonded to the primary surfaces of the single-crystal substrates 2, 3. Referring to the direction along the inclined surfaces 21, 31 extend from the sides 21a, 31a to the sides 21b, 31b as "the direction of extension of the inclined surfaces 21, 31", the depressions 20, 30 are deepened progressively from the primary surfaces of the single-crystal substrates 2, 3 along the direction of extension. As shown in FIG. 1, the depressions 20, 30 having the wide inclined surfaces 21, 31 are formed by causing the primary surfaces of the single-crystal substrates 2, 3 formed with the depressions 20, 30 to have a specified crystal plane. In the silicon single-crystal substrate, for example, it is specified as a crystal plane at an angle of 11° with respect to the (111) crystal plane.

One of the primary surfaces (hereinafter referred to as the first primary surface) of the glass substrate 1 is bonded to the single-crystal substrate 3 and the other primary surface (hereinafter referred to as the second primary surface) of the glass substrate 1 is bonded to the single-crystal substrate 2 in such a manner that the direction of extension of the inclined surface 31 of the depression 30 and the direction of extension of the inclined surface 21 of the depression 20 are opposite to each other and that the inclined surfaces 21, 31 facing each other through the glass substrate 1 are parallel to each other. Further, that area of the first primary surface of the glass substrate 1 which is facing the depression 30 (the opening of the primary surface of the single-crystal substrate 3) of the first primary surface of the glass substrate 1 is formed with an optical filter 4 capable of selectively transmitting only a light of wavelength λ1 and an optical filter 6 capable of transmitting only a light of wavelength λ2, both facing the inclined surface 31 of the depression 30.

The "optical filters 4, 6" described in this embodiment are members of which the transmittance to the light of a specified wavelength or in a specified wavelength range is higher than the transmittance thereof to the light of wavelength different from the specified wavelength or out of the specified wavelength range, and also referred to as members for selectively transmitting the light of the specified wavelength or in the specified wavelength range. In view of the operating principle of the filter element according to this embodiment described later, the optical filters 4, 6 preferably have a substantially negligible reflectivity lower than the transmittance to the light of the specified wavelength or in the specified wavelength range. Also, each of the optical filters 4, 6 preferably has a high reflectivity to the light not selectively transmitted (wavelength thereof is different from the specified wavelength or out of the specified wavelength range), and the reflectivity is desirably higher than at least the aforementioned transmittance to the light not selectively transmitted. A typical example of the optical filter having this optical characteristic is known as a "band pass filter". In this and subsequent embodiments, each of the optical filters 4, 6 is, therefore, referred to as the band pass filter for convenience' sake. However, in the implementation of the filter element and the optical module according to the invention, both the optical filters 4, 6 are not necessarily limited to the band pass filter but may be replaced by a high-pass filter or a low-pass filter.

A plurality of the band pass filters (the two band pass filters 4, 6 in this embodiment) having different ranges of transmissive wavelengths, which are formed on the first primary surface of the glass substrate 1, are arranged along the direction of extension of the inclined surface 31, and the range of transmissive wavelengths of the band pass filter 4 arranged near to the side 31a of the inclined surface 31, for example, is shifted to a shorter wavelength side than the range of the transmissive wavelengths of the band pass filter 6 arranged nearer to the side 31b. According to this embodiment, the transmissive wavelength $\lambda 1$ of the band pass filter 4 is set to 1.3 μm, and the transmissive wavelength $\lambda 2$ of the band pass filter 6 is set to 1.48 μm. The area of the glass substrate 1 facing the depression 20 (the opening of the primary surface of the single-crystal substrate 2) on the second primary surface of the glass substrate 1, on the other hand, is formed with a total reflection film. The total reflection film 5 is formed facing the band pass filters 4, 6 through the glass substrate 1. Nevertheless, the first end of the total reflection film 5 may be formed at a greater distance than the first end of the band pass filter 4 from the side 21b of the inclined surface 21 of the depression 20 (or the side 31a of the inclined surface 31 of the depression 30) in "the direction of the primary surfaces" in the shown orthogonal coordinate so that the total reflection film 5 may not extend between the first end of the band pass filter 4 and the inclined surface 21 of the depression 20. Also, the other end (hereinafter referred to as the second end) distant from the first end of the total reflection film 5 may be extended to a position nearer to the side 21a of the inclined surface 21 (or the side 31b of the inclined surface 31) than the band pass filter 6 in the "direction of the primary surfaces".

The filter element shown in FIG. 1 receives the light of wavelength $\lambda 1$ (=1.3 μm) from a light-emitting element (not shown) on the second primary surface (hereinafter sometimes referred to as the outer surface) distant from the first primary surface (the surface bonded with the glass substrate 1) of the single-crystal substrate 3, and the second primary surface (hereinafter sometimes referred to as the outer surface) of the single-crystal substrate 2 distant from the first primary surface (the surface bonded to the glass substrate 1) is optically coupled to an optical fiber (waveguide) 8 through a lens 7. The single-crystal substrates 2, 3 constituting the filter element according to this embodiment are each formed of a silicon (Si) single crystal and transmit light in a wide wavelength range from 1.3 to 14 μm to the infrared light. The depressions 20, 30 formed on the single-crystal substrates 2, 3, on the other hand, are closed by the glass substrate 1 and the interior thereof may be filled up with air or kept decompressed. The light of wavelength $\lambda 1$ from the light-emitting element not shown, after entering the outer surface of the single-crystal substrate 3, is refracted on the side of the side 31a of the inclined surface 31, and transmitted at around the first end of the band pass filter 4 to the outer surface of the single-crystal substrate 2 through the lens 7, and enters the optical fiber 8. The optical fiber 8, on the other hand, propagates a plurality of signals of different wavelengths, which enter the filter element (the outer surface of the single-crystal substrate 2) through the lens 7. According to this embodiment, the optical signal of wavelength $\lambda 2$ (=1.48 μm) and the optical signal of wavelength $\lambda 3$ (=1.55 μm) are transmitted by the optical fiber 8.

These optical signals enter the silicon single-crystal substrate 2 from the optical fiber 8 through the lens 7, and further enter the glass substrate 1. The optical signal ($\lambda 1$) transmitted from the filter element to the optical fiber 8 and the optical signals ($\lambda 2$, $\lambda 3$) received by the filter element through the optical fiber 8 follow the same optical path regardless of the wavelength thereof, Therefore, the optical paths of these optical signals coincide with each other. In order to facilitate the visual comparison of the behaviors of the transmitted light ($\lambda 1$) and the received light ($\lambda 2$, $\lambda 3$), the respective optical paths are displayed being slightly shifted horizontally from each other.

The band pass filter 4 included in the filter element according to this embodiment transmits only the light of wavelength $\lambda 1$ (=1.3 μm) and reflects the light of other wavelength. Thus, the optical signals of wavelength $\lambda 2$ and $\lambda 3$ are reflected by the band pass filter 4, and subjected to multiple reflection between the total reflection film 5 and the band pass filter 4. Once the optical signals thus subjected to the multiple reflection enter the band pass filter 6 for transmitting only the light of wavelength $\lambda 2$ (=1.48 am), the light of wavelength $\lambda 2$ is passed through the band pass filter 6 and further through the silicon single-crystal substrate 3. The light of wavelength $\lambda 3$ (=1.55 μm), on the other hand, is reflected on the band pass filter 4, and after being subjected to multiple reflection again between the total reflection film 5 and the band pass filter 6, leaves the glass substrate 1 from an area thereof on the first primary surface of the glass substrate 1 not formed with the band pass filter 6. This light is transmitted through the silicon single-crystal substrate 3 and exits from the outer surface thereof.

Figure 2:
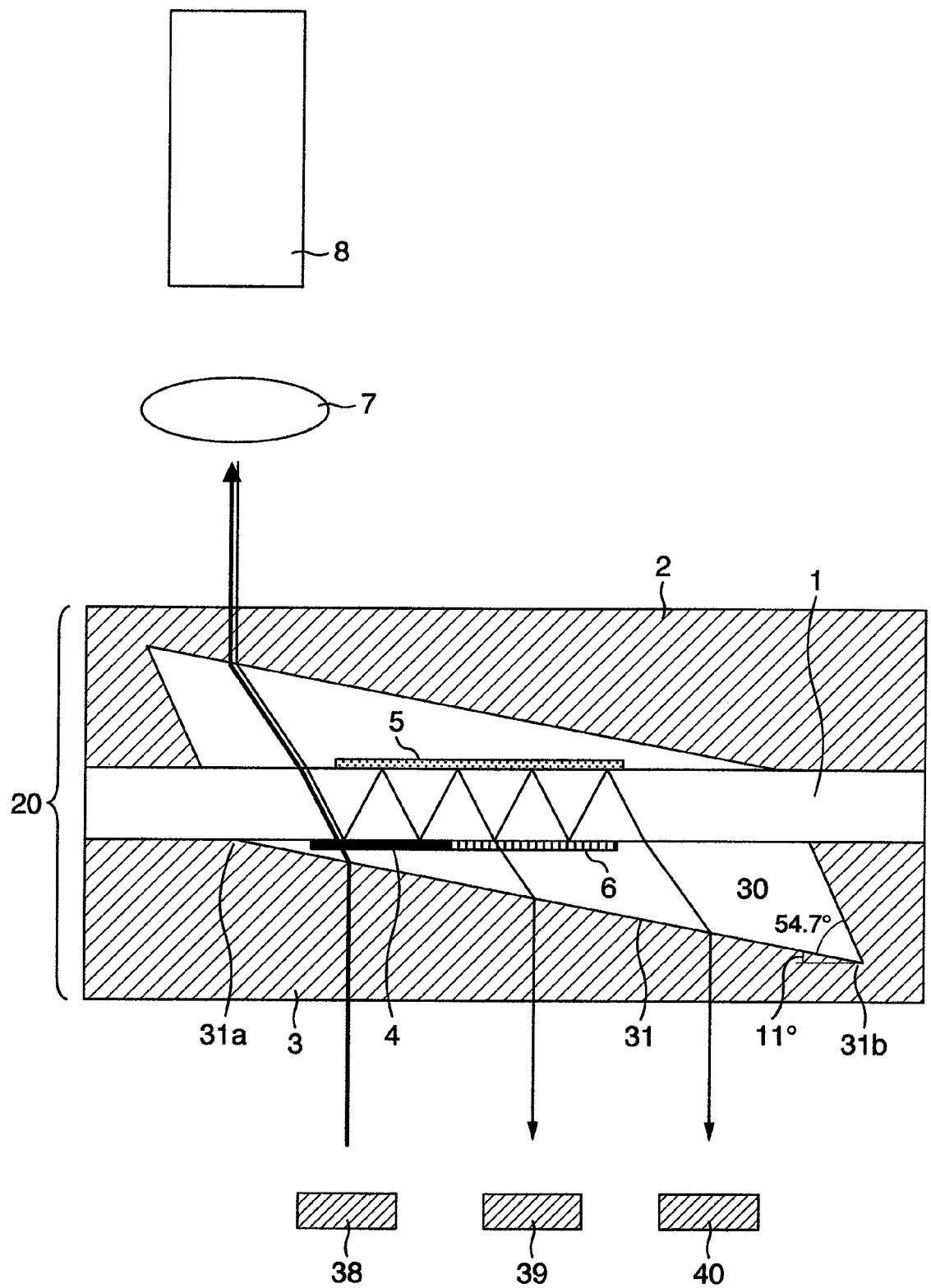
FIG. 2 is a diagram schematically showing the sectional structure of a filter element according to the first embodiment.

FIG. 2 schematically shows the sectional structure of an optical module having the filter element described above. Out of the outer surface of the silicon single-crystal substrate 3, a laser diode (light-emitting element, hereinafter referred to as LD) 38 facing the position at which the light of wavelength $\lambda 1$ is transmitted (enters), a photodiode (light-receiving element, hereinafter referred to as PD) 39 facing the position at which the light of wavelength $\lambda 2$ is transmitted (exits), and the PD 40 facing the position at which the light of wavelength $\lambda 3$ is transmitted (exits) are arranged, thereby to transmit (emit) the light at the respective positions. In the optical module according to this embodiment having this configuration, the optical signal of wavelength $\lambda 1$ is transmitted by the laser oscillation of the LD 38 corresponding to the transmission signal and the change in the strength of the light having the wavelength $\lambda 2$, $\lambda 3$ sent from the optical fiber 8 are detected, thereby to receive the two types of the optical signal.

The fabrication process of the filter element (band pass filter part) according to this embodiment shown in FIG. 1 is explained below. First, a resist film pattern is formed by photolithography on each of the primary surfaces (the first primary surface and the second primary surface on the side distant from the first primary surface as described above) of the glass substrate 1. The resist films formed on the first and second primary surfaces, respectively, are each formed with an "opening" to expose the corresponding primary surface at a position where the band pass filters and the total reflection film described above are to be formed. Next, dielectric multilayer films to form the band pass filters 4, 6 and a metal film to constitute the total reflection film 5 are formed by sputtering or vapor deposition on the primary surfaces of the glass substrate 1 formed with the resist film. The dielectric multilayer films to form the band pass filters 4, 6 are formed by sequentially stacking a plurality of dielectric layers having different compositions selected to achieve the desired transmission characteristic (for example, a high transmissivity for the light in a specified wavelength range and a high reflectivity for the light of wavelength out of the specified wavelength range). The dielectric multilayer film may be made of multiple layers of $SiO_2$ and $Ta_2O_5$, for example. The total reflection film, on the other hand, can be formed by metalization with a metal having a high reflectivity.

Next, the single-crystal substrates 2, 3 are processed. In the case where the single-crystal substrates 2, 3 are formed of Si, the primary surfaces thereof are wet etched in a KOH (potassium hydroxide) solution or the like thereby to form the inclined surfaces 21, 31 on the primary surfaces. In the single-crystal substrates 2, 3 formed of silicon single crystal having the face-centered cubic lattice of the diamond structure, the inclined surfaces thereof represent the (111) plane of closest packing. These inclined surfaces 21, 31 each is frequently constituted by the side walls of the depressions called etch pits formed by etching on the primary surfaces of the single-crystal substrates 2, 3, and in the case where the plane orientation of the primary surfaces is (100), the angle θ between the primary surfaces and the inclined surfaces is as large as 54.7°. The main single-crystal materials (mainly the semiconductor single crystal) including the Si (silicon) substrate are cleaved at a specified crystal plane to cut out a wafer having the primary surface with high flatness. At an excessively large angle θ, however, the optical paths extending from the inside of the single-crystal substrates 2, 3 to the depressions 20, 30 formed on the primary surfaces thereof cannot be sufficiently bent by the inclined surfaces 21, 31 of the depressions and cross the primary surfaces of the glass substrate 1 substantially at right angles thereto. The band pass filters formed on the primary surface of the glass substrate 1, therefore, cannot reflect even the undesired wavelength components of the light incident from the other primary surface, and it becomes difficult for the filter element to discriminate a plurality of optical signals assigned different wavelengths in the near infrared light range (the wavelength of 0.7 to 2.5 μm) and the visible range (wavelength of 0.36 to 0.83 μm based on JIS Z8120). For this reason, the wafer of the single-crystal material (Si) cut into the single-crystal substrates (Si substrates) 2, 3 constituting the filter element used in this embodiment is sliced from an ingot of the single-crystal material (Si) in such a manner that the primary surfaces thereof form an angle of 11° with respect to the (111) plane, and is subsequently polished to complete the preparation. Namely, the "primary surfaces" of the Si substrates 2, 3 and the Si wafer providing the base material thereof have a crystal plane difficult to cleave as compared with the (111) or (100) plane. The Si substrates 2, 3 (Si wafer) are etched by immersing the wafer in the KOH solution (etchant) with a mask of a $SiO_2$ oxide film formed on the primary surfaces. The $SiO_2$ oxide film is formed beforehand with an opening corresponding to a desired portion of the primary surface of the Si wafer (the portion of the Si substrates 2, 3 where the depressions 20, 30 are to be formed), so that only the primary surfaces exposed to the openings are etched selectively in the KOH solution.

In the case where the Si wafer with the (100) plane as a primary surface is etched through the mask described above, an etch pit corresponding to the mask opening is formed into a tetrahedron or a truncated pyramid having side walls with the Si (111) plane and its four equivalent crystal planes thereto jointed with each other. According to this embodiment, however, the primary surfaces of the Si wafer form a predetermined angle to the (100) plane, and therefore, the (111) plane forming the side walls of the etch pit or one equivalent crystal plane thereto is formed wider than the remaining three. This crystal plane with the largest side wall area constitutes the "inclined surfaces 21, 31" of the single-crystal substrates 2, 3 of the individualized filter element, and functionalize the filter element facing the glass substrate 1 and the band pass filters formed on the primary surfaces thereof. The primary surfaces of the Si wafer (the single-crystal substrates 2, 3) are formed with the openings of the etch pits (depressions 20, 30) in correspondence with the openings of the mask. In the etch pits in the form of tetrahedron or truncated prism, the area of each side wall thereof projected on the primary surfaces of the Si wafers is not more than one fourth of the opening area of the etch pit. The area projected on the primary surfaces of the Si wafer (the single-crystal substrates 2, 3) of the "inclined surfaces 21, 31" appearing in the etch pits (depressions 20, 30) according to this embodiment, on the other hand, is at least one half of the opening area of the etch pit, and the "wedge-shaped" etch pitch shown in FIG. 1 has a larger area than the opening area. The inclined surfaces 21, 31 have a similar shape to the etch pit opening and are rectangular (oblong or square), for example.

The inclined surfaces 21, 31, including the sides 21a, 31a nearest to the primary surfaces of the Si wafers (the single-crystal substrates 2, 3) and the sides 21b, 31b opposed to the sides 21a, 31a and farthest from the primary surfaces of the Si wafers, extend from the sides 21a, 31a toward the sides 21b, 31b along such direction the surface crosses the sides 21a, 31a, respectively. In this specification, the direction crossing the sides 21a, 31a and extending from the sides 21a, 31a to the sides 21b, 31b is hereinafter defined as "the direction of extension" of the inclined surfaces 21, 31. As compared with "the primary-surface direction" shown in FIG. 1, for example, the direction of extension of the inclined surface 21 is defined as "the direction" from right to left, and the direction of extension of the inclined surface 31 as "the direction" from left to right. In "the direction of extension" of the inclined surfaces 21, 31 thus defined, "the distance (of the inclined surfaces 21, 31) from the primary surfaces of the Si wafers (the length along the thickness of the Si wafers)" increases monotonically. This distance is also defined as the depth of the etch pits (depressions 20, 30) formed on the primary surfaces of the Si wafers (the single-crystal substrates 2, 3) or as "the distance from the primary surfaces of the glass substrate 1" bonded to the primary surfaces of the Si wafers. The sides 21a, 31a of the inclined surfaces 21, 31 shown in FIG. 1, which are in contact with the primary surfaces of the Si wafers (the single-crystal substrates 2, 3) formed with the etch pits (depressions 20, 30), may alternatively be located at some distance from the primary surfaces of the Si wafers as a result of processing the primary surfaces of the Si wafers, etc. without adversely affecting the functions of the filter element according to this embodiment.

In what is called the wafer-level process in which a pattern corresponding to a plurality of filter elements (a plurality of etch pits) is formed on the primary surfaces of the Si wafers, and then the Si wafers are diced into single-crystal substrates 2, 3, the $SiO_2$ oxide film (mask) is removed from the Si wafers upon completion of the etching process, followed by bonding each wafer to the glass substrate 1 (in the mother glass state before individualization).

The anodic bonding capable of bonding the Si wafers (the single-crystal substrates 2, 3) and the glass substrate 1 directly to each other is preferably used as a bonding method. In the anodic bonding, a voltage is applied to each of the cathode on the glass substrate 1 and the anode on the Si wafers so that the positive ions such as $Na^+$ contained in the glass substrate 1 are forcibly diffused to the Si wafers. In the process, the balance of the electric charge in the glass substrate 1 is collapsed, and a strong electrostatic attraction force is generated in the vicinity of the boundary between the glass substrate 1 and the Si wafers (the single-crystal substrates 2, 3). This electrostatic attraction force attaches the glass substrate 1 and the Si wafers closely to each other. In order to diffuse the ions in the glass substrate 1 into the Si wafers, it is normally necessary to heat the vicinity of the boundary to 300° C. or higher while at the same time applying a voltage of several hundred volts to this boundary. Once the glass substrate 1 and the Si wafers closely attach to each other, the oxygen atoms in the glass substrate 1 react with the Si atoms of the wafers, and a strongly bonded boundary is formed between them.

With reference to FIG. 1, what is called the chip-level process is explained in which the filter element according to this embodiment is assembled by bonding the Si substrates (the single-crystal substrates) 2, 3 cut out from the Si wafer to the glass substrate 1 cut out from the mother glass. In this chip-level process, the primary surface of the Si substrate (the single-crystal substrate) 2 formed with the depression 20 (the peripheral portion surrounding the depression 21) is brought into contact with the second primary surface (the upper surface in FIG. 1) of the glass substrate 1. Then, a voltage is applied between the anode and the cathode while pressing the anode against the Si substrate 2 and the cathode against the glass substrate 1, so that the primary surface (peripheral portion) of the Si substrate 2 and the second primary surface of the glass substrate 1 are bonded to each other by anodic bonding. After fixing the Si substrate 2 on the second primary surface of the glass substrate 1 in this way, the primary surface (the peripheral portion surrounding the depression 30) of the Si substrate (single-crystal substrate) 3 formed with the depression 30 is brought into contact with the first primary surface (the lower surface in FIG. 1) of the glass substrate 1. Next, a voltage is applied between the anode and the cathode while pressing the anode against the Si substrate 3 and the cathode against the Si substrate 2 (what is called the glass substrate 1 side member), so that the primary surface (peripheral portion) of the Si substrate 3 and the first primary surface of the glass substrate 1 are bonded to each other by anodic bonding. In the fabrication process of the filter element described above, the Si substrates (single-crystal substrates) 2, 3 may be bonded by anodic bonding to the glass substrate 1 in reverse order. These fabrication methods are applicable also to the wafer-level process described above.

As described above, the filter element according to this embodiment is configured by bonding a pair of Si substrates (single-crystal substrates) 2, 3 directly to the two primary surfaces of the glass substrate 1, and therefore, the thermal expansion coefficients of the respective members are desirably as close to each other as possible. In fabricating the filter element according to this embodiment using the Si substrates as the single-crystal substrates 2, 3, the glass substrate 1 is desirably made of borosilicate glass ($SiO_2$—$B_2O_3$) having the coefficient of thermal expansion approximate to that of silicon (Si). The material suitable for the borosilicate glass substrate includes PYREX (R), a registered trademark owned by Corning Inc., New York, US, or TEMPAX Float (R), a registered trademark owned by Schott AG., Mainz, Germany. The material recommended for the glass substrate 1 of the filter element according to this embodiment is not limited to borosilicate glass, and other glass having the coefficient of thermal expansion near to that of silicon and containing alkali ions, which can also be bonded to the Si substrate by anodic bonding, is applicable to the filter element.

In the case where the Si substrates (single-crystal substrates) 2, 3 and the glass substrate 1 are bonded to each other not by anodic bonding but by an adhesive, the fact that the adhesion boundary or the vicinity thereof is heated at lower temperature than in the anodic bonding permits the thermal expansion coefficient of the glass substrate 1 to be mismatched with that of the Si substrates 2, 3. This is also true in the case where the primary surfaces (joints) of the Si substrates 2, 3 and the glass substrate 1 are formed with matalized portions, and the metalized portions are bonded to each other by soldering. In order to reduce the strain in the filter element or the optical module completed by these bonding methods, however, the Si substrates 2, 3 and the glass substrate 1 are required to have substantially the same thermal expansion coefficient regardless of adhesive or solder used to bond the metalized portions.

Figure 3:
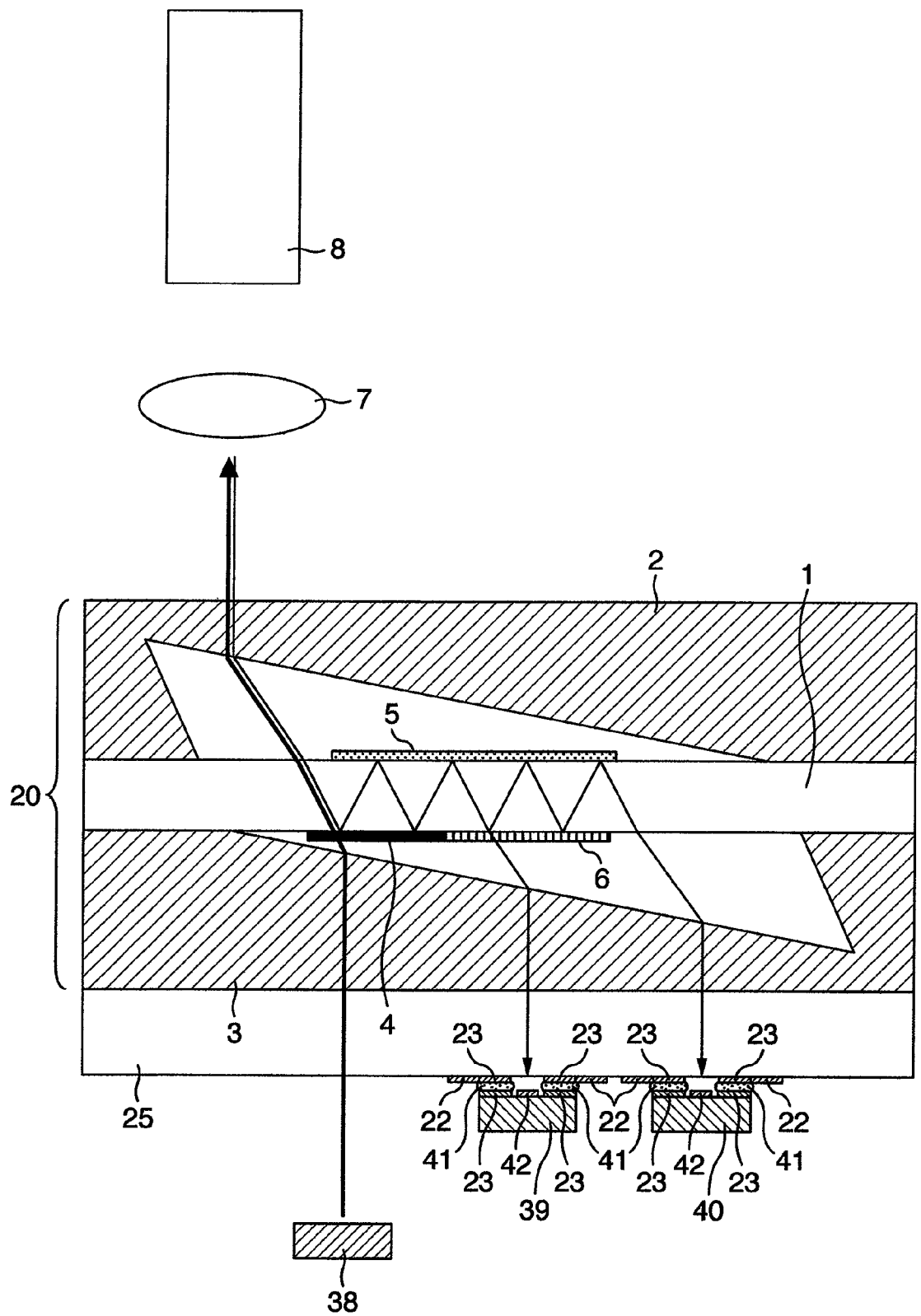
FIG. 3 is a diagram schematically showing the sectional structure of a filter element according to the first embodiment.

The filter element 20 fabricated by the method described above can bring out the function as an optical module by arranging the LD 30 and the PDs 39, 40 at the light input and output positions, respectively, as shown in FIG. 2. As shown in FIG. 3, the optical module can be fabricated more easily by bonding a second glass substrate 25 to the filter element 20 and packaging the PDs 39, 40 on the second glass substrate 25. The second glass substrate 25 can be bonded by such a method as anodic bonding or adhesive or by soldering the area other than the area transmitting light.

On the second glass substrate 25, wirings 22 and electrodes 23 are provided beforehand by forming a metalized pattern using photolithography. Each metalized portion is preferably an integration of metals such as Ti/Ni/Au, Ti/Pt/Au or Cr/Ni/Au. The electrode positions are determined by optical design. Specifically, the positions of the electrodes 23 are determined in such a manner that each light-receiving unit 42 of the PDs 39, 40 is located at a light-receiving position. The light input and output positions are defined by the thickness and the refractive index of the glass substrate and the shape of silicon. Thus, the light input and output positions are determined in advance based on these information, and then the positions of the electrodes 23 are designed by taking the relative positions of the PD light-receiving units and the PD electrodes into consideration.

As described above, the electrodes 23 and the wirings 22 are provided on the second glass substrate 25, which in turn is bonded to the filter element 20. This assembly is desirably conducted with the wafer not diced into elements in order to improve the productivity. Accordingly, the second glass substrate 25 is also bonded to the filter element 20 in the sheet state with a positioning accuracy within an error of ±2 to 3 µm by attaching alignment marks (not shown) on the wafer formed with the filter element 20 and the sheet of the second glass substrate 25.

The filter element 20 fabricated in this way is individualized, cleaned and packaged with optical elements. The PD 40 with the electrode 23 formed only on the light-receiving surface thereof is employed. The optical elements can be packaged by any of the methods including soldering, conductive adhesive and ultrasonic bonding using Au bumps. In each case, the solder, the conductive adhesive and the Au bumps constitute the bonding agent 41.

The advantage of packaging the optical elements on the second glass substrate is described. First, the light-receiving element 40 can be arranged at a short distance from the filter element 20, and therefore, even in the case where the light emitted from the filter element 20 is inclined slightly from the direction perpendicular to the substrate surface, the displacement in the substrate surface is very small, thereby facilitating the entrance of the light into the PD light-receiving unit. Similarly, in the case where the filter element 20 is packaged in a housing of the optical module with a slight angular shift from the horizontal direction, a long distance from the filter element to the light-receiving element would increase the adverse effect of the displacement in the plane. However, since the light-receiving element is directly attached to the filter element through the second glass substrate as shown in FIG. 3, the adverse effect of the position shift is avoided.

Also, since the glass substrate 25 has a smaller dielectric constant than the substrate of silicon or the like, a high-frequency signal can be easily transmitted using the wiring formed on the glass substrate. Especially at the transmission rate of 10 Gbps, for example, the transmission becomes easier by forming the wiring on the glass substrate.

Incidentally, the light-emitting element 30 is not mounted on the second glass substrate 25 in FIG. 3. The light-receiving element 40 has generally small heat generation, and therefore, poses no heat problem if mounted on the glass substrate. Also, such an arrangement has a great advantage for transmission of the high-frequency signal. On the other hand, the light-emitting element 30 generates a large amount of heat at the time of operation, and therefore, if mounted on the second glass substrate 25, an insufficient heat radiation may transmit the heat to the optical module, thereby causing a strain in the optical path due to the thermal expansion. This problem is not posed, however, for the light-emitting element 30 when the operation rate is so low that heat generation can be ignored.

Another advantage is obtained by a configuration in which the light-emitting element 30 is mounted at a different place and the light-receiving element 40 is mounted on the second glass substrate 25 with the filter element 20. The optical signal arriving from the optical fiber is separated into components of different wavelengths through the structure of the filter element 20 and emitted from the filter element 20 at a predetermined position. Therefore, the light-receiving element is desirably packaged at the position. This positioning arrangement is what is called the passive alignment and can be implemented taking into consideration the fact that the light-receiving diameter of the light-receiving element is several tens of μm and the positioning accuracy is several μm.

The passive alignment for the light-emitting element, on the other hand, is considered to require a high-accuracy positioning process. In an optical module using the multi-mode fiber, the structure is considered also possible in which the light-emitting element 30 is mounted on the second glass substrate 25 by passive alignment. In the case of the single-mode fiber, however, the active alignment is considered to be suitable in which the light-emitting element 30 is packaged on another substrate, and under operation of the light-emitting element 30, positioning the fiber is conducted.

Figure 4:
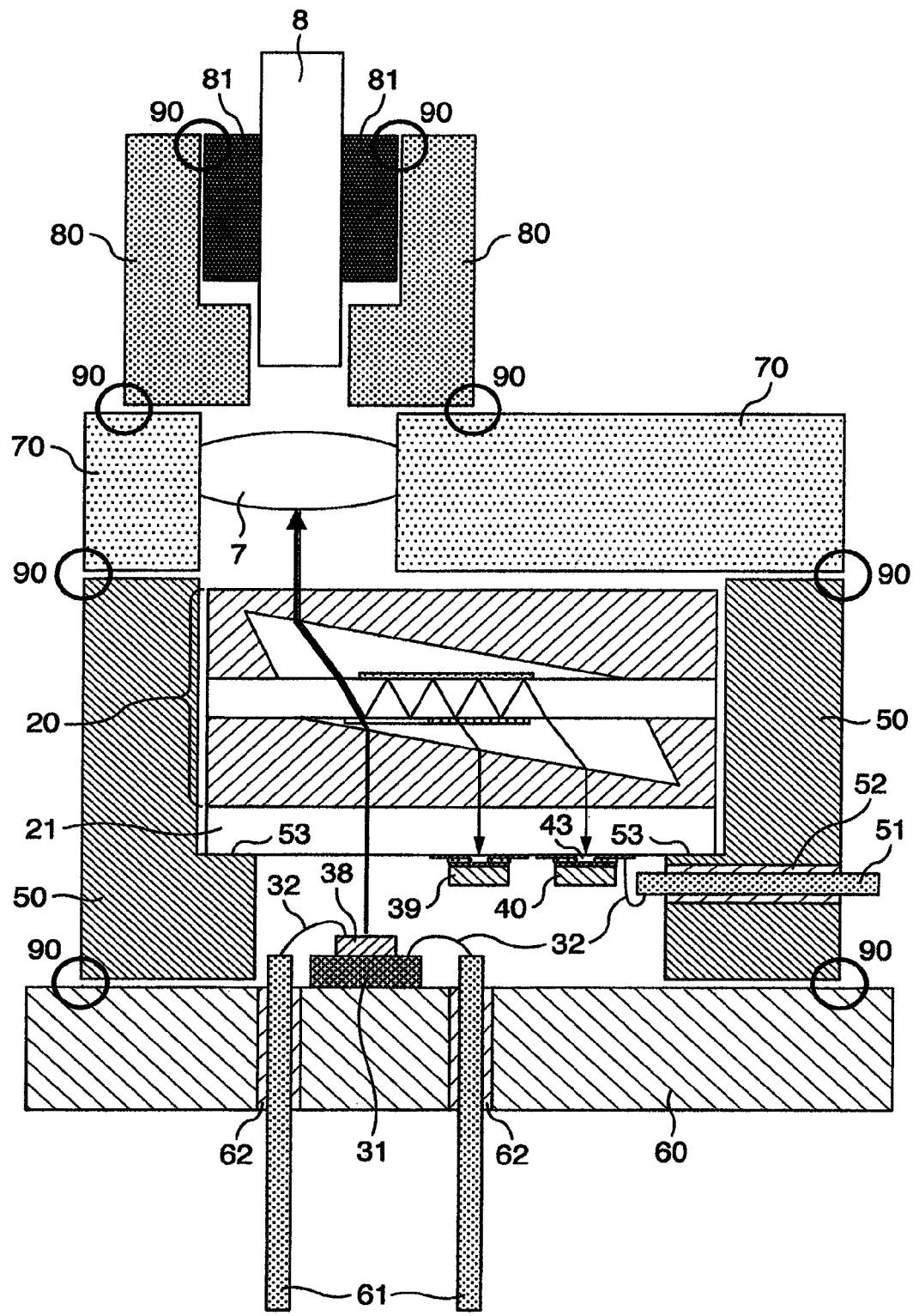
FIG. 4 is a diagram schematically showing the sectional structure of an optical module according to the first embodiment.

FIG. 4 shows a specific configuration of the optical module. The filter element 20 packaged with the PDs 39, 40 is fixedly bonded on the first housing 50 with an adhesive 53. The electrical connection with the PDs 39, 40 is established in such a manner that a terminal 51 arranged with an insulating member 52 through the first housing 50 is connected with the wiring 22 on the second glass substrate 25 by wire bonding. In this way, the output signal of the PDs 39, 40 can be output outside the optical module.

The light-emitting element 30, on the other hand, is mounted on a submount 31 using a thin-film solder of Au—Sn or the like, and the submount 31 is mounted on the second housing 60 using a conductive adhesive or the like. A terminal 61 arranged with an insulating member 62 through the second housing is connected by wire bonding 32 to the light-emitting element 30, thereby making it possible to input the signal to the light-emitting element 30 from outside the optical module.

The lens 7 is fixed by bonding or the like means on a third housing 70. The fiber 8 is fixed on a member 81.

By assembling the structure shown in FIG. 4, the light-emitting element 30 is operated and optically coupled to the lens 7 and the fiber 8. Under this condition, YAG welding is conducted sequentially at points 90 to bond the first housing 50, the second housing 60, the third housing 70, the member 80 and the member 81, thereby fabricating the optical module.

Second Embodiment

Figure 5:
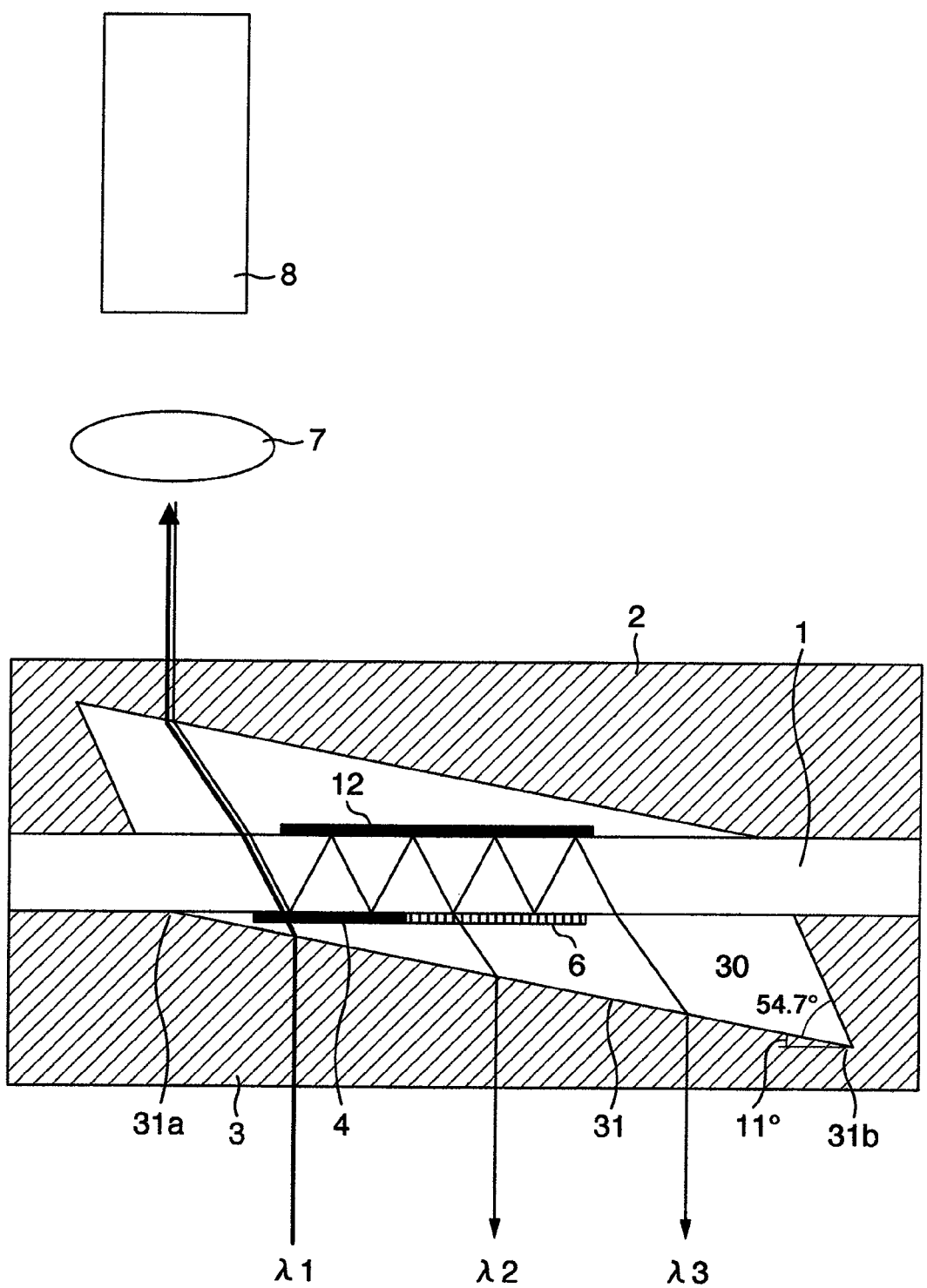
FIG. 5 is a diagram schematically showing the sectional structure of a filter element according to a second embodiment.

The filter element according to a second embodiment of the invention is explained with reference to FIG. 5. In the filter element according to this embodiment, the total reflection film 5 of the filter element explained in the first embodiment is replaced by a band pass filter 12 formed on the second primary surface (the upper surface in FIG. 5) of the glass substrate 1 transmitting only the wavelength λ1. The total reflection film 5 is thus replaced by the band pass filter 12 in order that the light of wavelength λ1, which is emitted from the light-emitting element (especially, a laser diode (LD)) and not fully collimated or entering the glass substrate 1 through the first primary surface (the lower surface in FIG. 5) accompanied by a small amount of scattered light, is prevented from reaching an area not formed with the band pass filter 6 on the first primary surface of the glass substrate 1 (outside the area formed with the band pass filter), while being reflected multiple times in the glass substrate 1 (what is called the filter element body). In the case where the inclined surface 31 facing the first primary surface and the sides 31a and 31b thereof described in the first embodiment are used, "the area not formed with the band pass filter 6 on the first primary surface of the glass substrate 1" described above is regarded as an area extending from the edge, nearer to the side 31b of the inclined surface 31, of the band pass filter 6 on the first primary surface toward the side 31b. Incidentally, the band pass filter 12 can be replaced appropriately by a high-pass filter or a low-pass filter if the optical filter is similar in the optical characteristic to the optical filters 4, 6 in the first embodiment. As a result, the band pass filter 12, though describable as the optical filter 12, is referred to as "the band pass filter" for convenience' sake in this specification.

In the optical module according to the first embodiment shown in FIG. 2, for example, a part of the light of wavelength λ1 entering the glass substrate 1 from the first primary surface thereof, for example, a non-collimated fraction or a scattered fraction, is returned into the glass substrate 1, without being emitted from the second primary surface, by the total reflection film 5 formed on the second primary surface of the glass substrate 1. Further, the total reflection film 5 causes the light to propagate along the shown primary-surface direction in the glass substrate 1 and enter the light-receiving element (PD) 40 arranged in such a manner as to receive the light emitted from outside the area formed with the band pass filter on the first primary surface. The PD 40 receiving the signal of the light of wavelength $\lambda 3$ entering the second primary surface of the glass substrate 1 through the lens 7 and the single-crystal substrate (for example, the Si substrate) 2 from the optical fiber 8, therefore, also detects the light of wavelength $\lambda 1$ propagated in the glass substrate 1. Thus, the optical signal of wavelength $\lambda 3$ received by the optical module may develop a crosstalk.

The filter element of this optical module is replaced by the filter element according to this embodiment or the band pass filter 12 is formed in place of the total reflection film 5 on the second primary surface of the glass substrate 1. In this way, the non-collimated fraction and the scattered fraction of the light of wavelength $\lambda 1$ are emitted from the second primary surface of the glass substrate 1 through the band pass filter 12, and further exits from the optical module through the single-crystal substrate 2 bonded to the second primary surface. As a result, the crosstalk which otherwise might be caused by the PDs 39, 40 receiving the optical signal is reduced. Also, the light of wavelength $\lambda 1$ which could not exit from the second primary surface of the glass substrate 1 is returned to the LD 30 from the first primary surface of the glass substrate 1 through the band pass filter 4, thereby preventing the disruption of the laser oscillation (what is called the return light problem).

The band filter 12 newly described in this embodiment, like the band pass filters 4, 6 formed on the first primary surface of the glass substrate 1 described in the first embodiment, may be formed of a dielectric multilayer film and preferably has such a characteristic that the light of wavelength $\lambda 1$ is selectively passed, while the light of other wavelengths (especially, the wavelength $\lambda 2$, $\lambda 3$) are not transmitted but reflected into the glass substrate 1. From this viewpoint, the band pass filter 12 may be formed of the same material as the band pass filter 4 in the area (the portion near the side 31$a$ of the inclined surface 31 opposed to the first primary surface) receiving the light of wavelength $\lambda 1$ on the first primary surface of the glass substrate 1, or the same dielectric multilayer film as the band pass filter 4.

Third Embodiment

The filter element according to a third embodiment of the invention is explained with reference to FIG. 6. The feature of the filter element according to the third embodiment resides in that a band pass filter 13 for selectively transmitting the light of wavelength $\lambda 3$ is arranged in a particular area (the area near to the side 31$b$ of the inclined surface 31 facing the particular area) on the first primary surface of the glass substrate 1 not formed with the band pass filter in any of the filter elements according to the aforementioned embodiments. Specifically, the band pass filter 4 for selectively transmitting the light of wavelength $\lambda 1$, the band pass filter 6 for selectively transmitting the light of wavelength $\lambda 2$ and the band pass filter 13 for selectively transmitting the light of wavelength $\lambda 3$ are arranged in this order on the first primary surface of the glass substrate 1 along the direction of extension from the side 31$a$ to the side 31$b$ of the inclined surface 31 facing the first primary surface of the glass substrate 1. The band pass filter 13 according to this embodiment can also be replaced appropriately by, for example, a high-pass filter or a low-pass filter if the optical filter is similar in optical characteristic to the optical filters 4, 6, 12 described above. In order to emphasize the functions thereof, however, the band pass filter 13 is so described herein instead of "the optical filter 13" for convenience sake.

Figure 6:
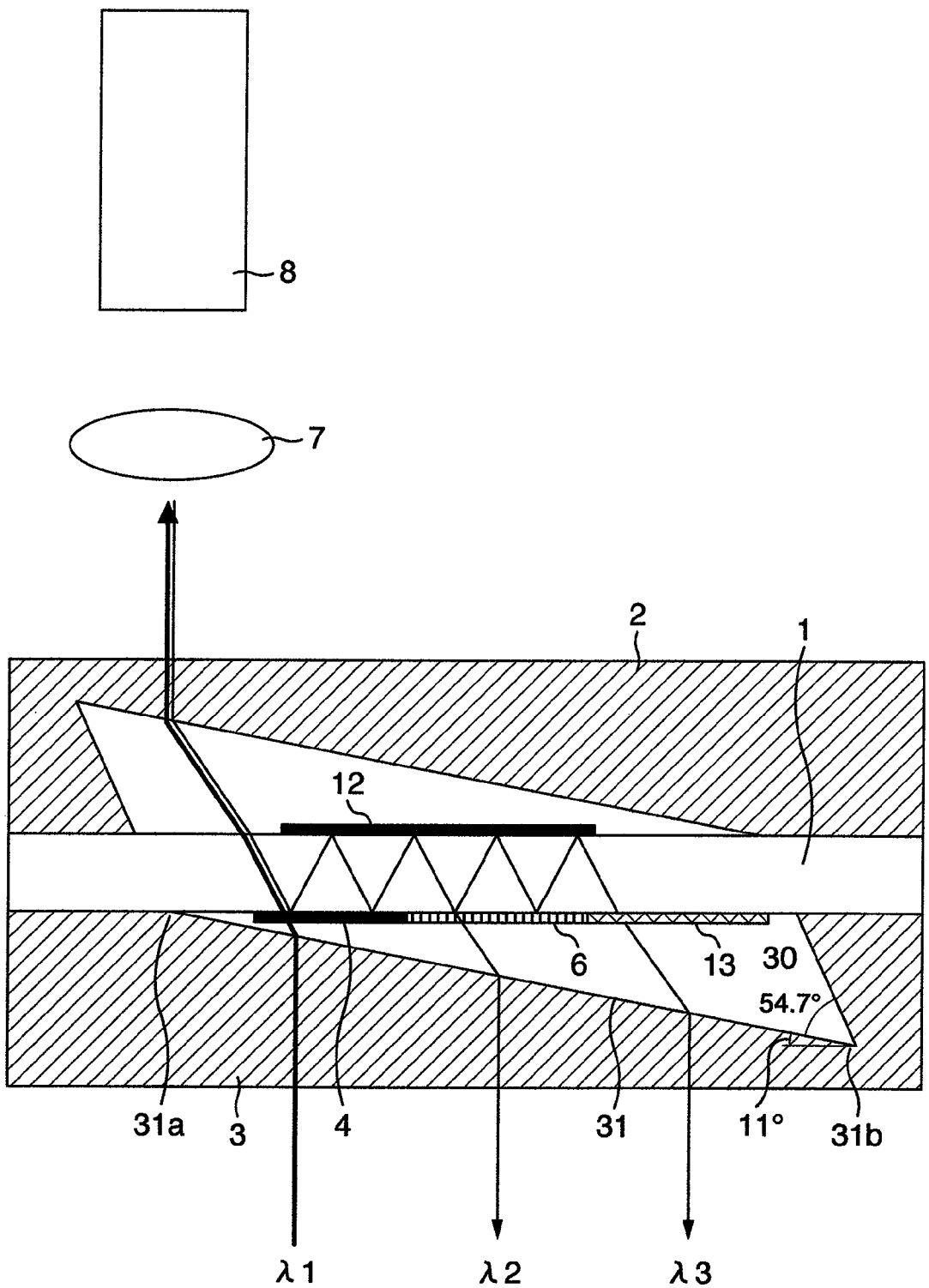
FIG. 6 is a diagram schematically showing the sectional structure of a filter element according to a third embodiment.

A light-emitting element not shown is arranged on the side of the filter element shown in FIG. 6, near to the single-crystal substrate 3 (lower surface side). The laser light of wavelength $\lambda 1$ emitted as a "transmission signal" from this light-emitting element is passed through the filter element from the single-crystal substrate 3 toward the single-crystal substrate 2, and received by an optical module arranged in another base station (not shown) by way of an optical fiber (waveguide) 8 entered through the lens 7. The optical fiber 8, on the other hand, propagates the laser light of wavelength $\lambda 2$, $\lambda 3$ transmitted from still another base station, and irradiates the laser light through the lens 7 on the outer surface of the single-crystal substrate 2 constituting a filter element. The filter element receives the laser light of wavelength $\lambda 2$, $\lambda 3$ as "a received signal" into the glass substrate 1, causes the laser light multiple reflection by the band pass filter 4 formed on the first primary surface and the band pass filter 12 formed on the second primary surface, and propagate the light in the direction of extension of the inclined surface 31 ("the primary—surface direction" shown). The light of wavelength $\lambda 1$ constituting what is called a noise for these received signals is emitted out of the glass substrate 1 through one of the band pass filters 4, 12. With the arrival of the received signals at the area formed with the band pass filter 6 on the first primary surface of the glass substrate 1, only the laser light of wavelength $\lambda 2$ is emitted from the first primary surface (the lower surface in FIG. 6) of the glass substrate 1 through the band pass filter 6 and is detected by the light-receiving element arranged facing the first primary surface (not shown). The laser light of wavelength $\lambda 3$, on the other hand, is reflected repeatedly on the band pass filter pair 6, 12, and propagated along the direction of extension of the inclined surface 31 in the glass substrate 1. Further, with the arrival of the received signal at the area formed with the band pass filter 13 on the first primary surface of the glass substrate 1, only the laser light of wavelength $\lambda 3$ is emitted from the first primary surface of the glass substrate 1 through the band pass filter 13 and is detected by another light-receiving element (not shown) arranged facing the first primary surface. In the process, the scattered part of the light of wavelength $\lambda 2$ and the stray or scattered light of other than wavelength $\lambda 3$ which may be left in the glass substrate 1, are not detected by another light-receiving element through the band pass filter 13.

Accordingly, in the case where the filter element according to this embodiment is built in the optical module (FIG. 2) described in the first embodiment, the crosstalk which otherwise might be caused with the detection of the received optical signals of wavelength $\lambda 2$, $\lambda 3$ are remarkably reduced.

Incidentally, the filter element according to this embodiment shown in FIG. 4 is based on the filter element according to the second embodiment (FIG. 3). The filter element according to this embodiment, however, not only constitutes an improvement of the filter element according to the second embodiment but also can be implemented with adding the feature thereof (the band pass filter 13) to the filter element according to the first embodiment (FIG. 1), and the operational advantages mentioned above can be attained.

Fourth Embodiment

Figure 7:
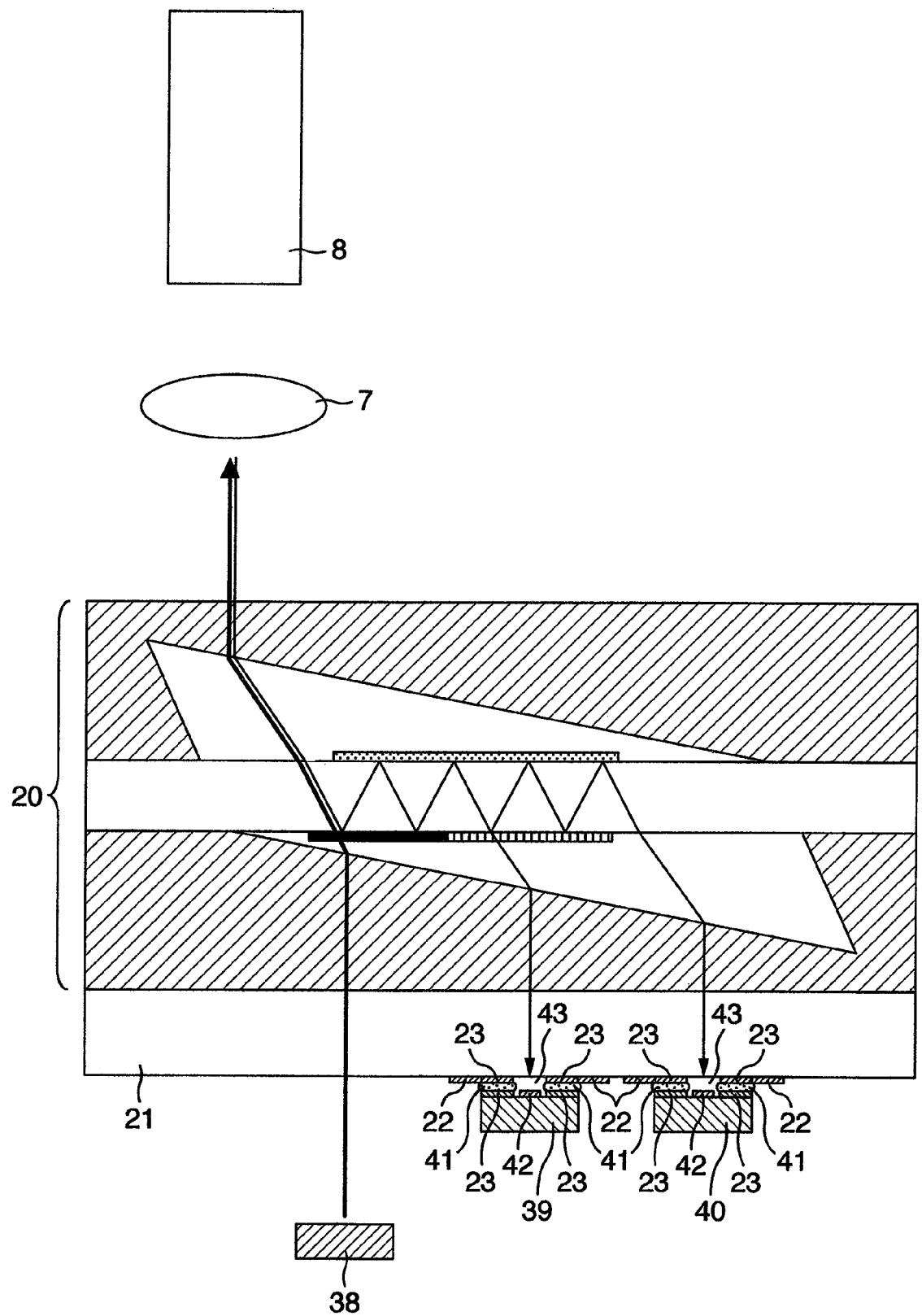
FIG. 7 is a diagram schematically showing the sectional structure of a filter element according to a fourth embodiment.

A fourth embodiment of this invention is explained with reference to FIG. 7. According to this embodiment, a transparent resin 43 for transmitting the optical signal is filled between each light-receiving element 40 and the second glass substrate 25, and the other points are the same as the first embodiment. In the case where the transparent resin 43 is not so filled, the large difference between the refractive index of the second glass substrate 25 and the refractive index of the air causes the optical signal passed through the second glass substrate 25 to be reflected on the surface of the second glass substrate 25 and thus reduces the strength of the optical signal of the light-receiving elements 40 under observation. According to this embodiment, the transparent resin 43 having the refractive index larger than that of the air and approximate to that of glass is arranged in proximity to the second glass substrate 25, so that the change in refractive index at the glass surface is reduced and the reflection is suppressed, thereby making it possible to suppress the strength reduction of the optical signal. Also, the close attachment of the transparent resin 43 contributes to a higher strength of connection between the light-receiving elements 40 and the second glass substrate 25.

Fifth Embodiment

Figure 8:
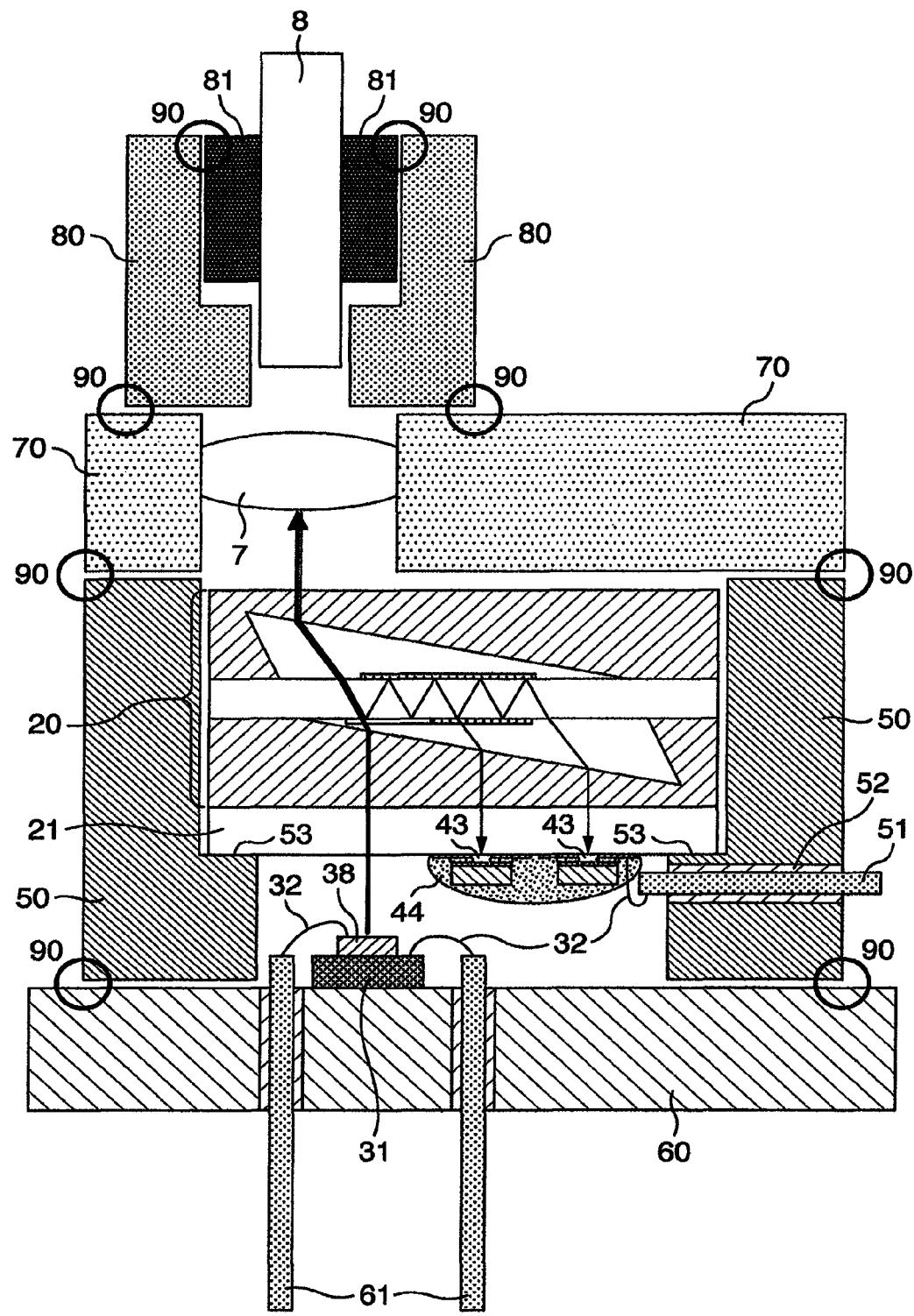
FIG. 8 is a diagram schematically showing the sectional structure of an optical module according to a fifth embodiment.

A fifth embodiment of the invention is explained with reference to FIG. 8. According to this embodiment, the filter element of the fourth embodiment, like in the first embodiment, is arranged with each housing, and further, the light-receiving elements 40 are covered with a non-transmissive resin 44 for shutting off the light. A black resin, for example, is suitable as the non-transmissive resin. The neighborhood of the light-receiving portion 43 of each light-receiving element 44 is filled with the transparent resin 43, and therefore, keeps off the non-transmissive resin 44. By covering the non-transmissive resin 44 on the outside of the transparent resin 43, the light from other than the filter element is shut off not to reach the light-receiving portion 43 of each light-receiving element 40. The light from the light-emitting element 30, if diffused or reflected at the surface of the filter element, is prevented from reaching the light-receiving portion of the light-receiving elements 40 without passing through the interior of the filter element 20, and therefore, the crosstalk between the light-emitting element 30 and the light-receiving elements 40 are effectively reduced.

Sixth Embodiment

Figure 9:
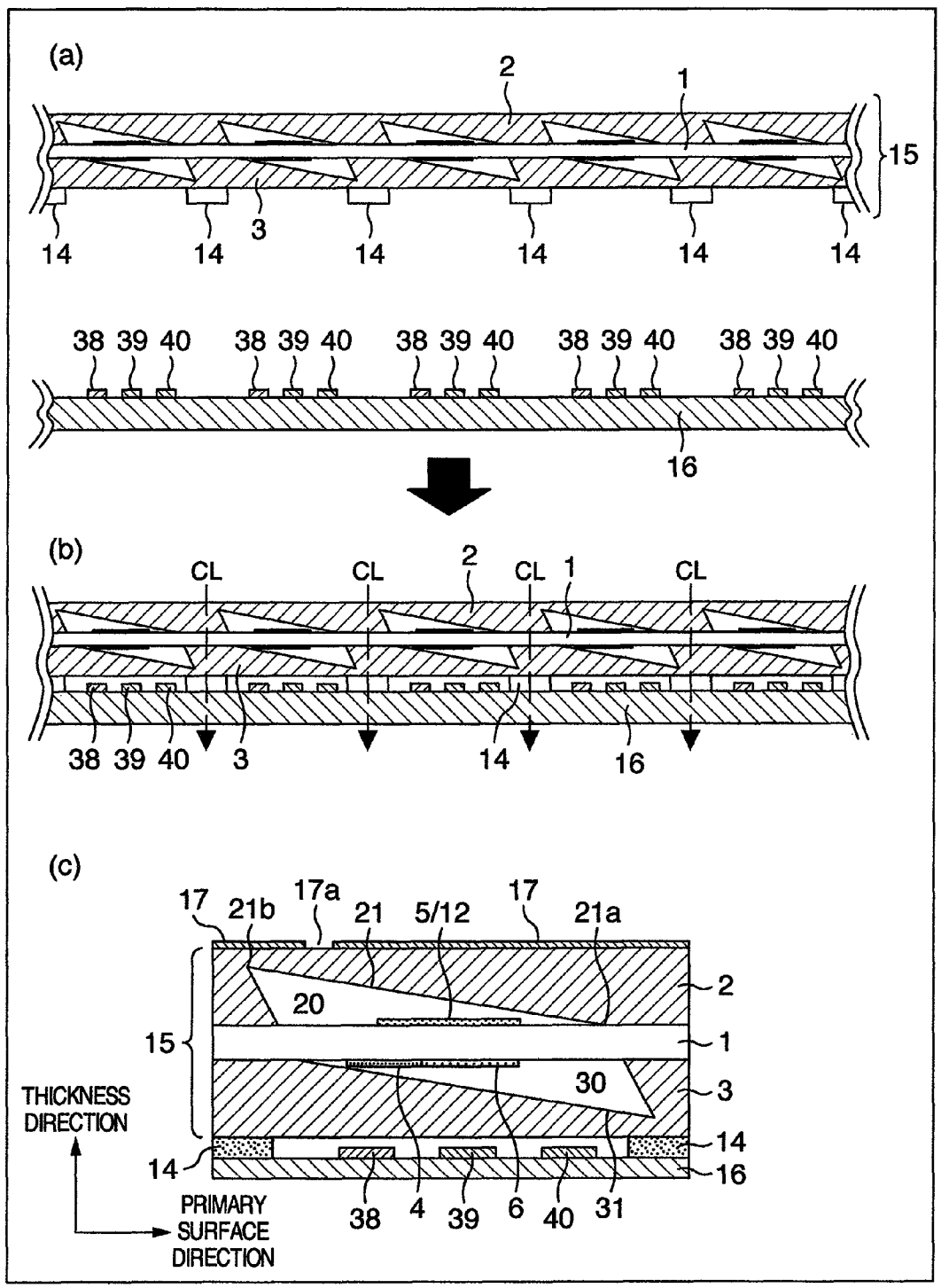
FIG. 9 is a schematic diagram for explaining the sectional structure of an optical module according to the fourth embodiment of the invention and a method of fabricating the optical module by packaging the optical element in each of the filter elements in the form of a wafer.

The filter element according to a sixth embodiment of the invention, an optical module including the filter element and a fabrication method thereof are explained with reference to FIG. 9. The optical module according to this embodiment is fabricated in the process on "wafer level" in which the glass substrates 1 and the single-crystal substrates 2, 3 constituting the optical modules are bonded to each other but not individualized into filter elements. Further, in the step of mounting one light-emitting element (LD 38) and a pair of light-receiving elements (PD 39, PD 40) on each filter element, the base substrate (hereinafter referred to simply as the substrate) 16 with the optical elements 38 to 40 fixed thereon is not separated for each optical module, but the base member (bulk material) thereof is bonded to the outer surface of the wafer to be individualized into the single-crystal substrates 3. The filter elements (hereinafter referred to as the band pass filter parts) 15 are assembled and bonded on the primary surface of the base substrate 16 in the wafer state on which the optical elements are mounted. Only after that, the integrated wafer unit is separated into individual optical modules. In this embodiment, the fabrication process of the optical module is explained in which the essential parts are assembled to produce each optical module from the band pass filter part 15 in the wafer state.

The filter element explained in the first to fifth embodiments and the structure equivalent thereto are both applicable to the band pass filter part 15 according to this embodiment. In order to bond the substrate 16 mounted with the optical elements 38 to 40 to the band pass filter part 15 at a predetermined space, the substrates 14 are bonded to the primary surface (outer surface) of the single-crystal substrate (Si substrate, for example) facing the optical elements, and patterned the substrates 14 into spacers. The thickness (the height from the outer surface of the single-crystal substrate 3) of the substrates (spacers) 14 is adjusted to realize an optical design in which a space permitting the optical elements to be arranged facing the outer surface through a gap is secured between the primary surface of the substrate 16 mounted with the optical elements 38 to 40 and the outer surface of the band pass filter part 15 (single-crystal substrate 3) facing the primary surface of the substrate 16 while at the same time making it possible to transmit/receive the optical signal through the band pass filter part 15 at each of the optical elements 38 to 40.

In the case where the single-crystal substrate 3 is a conductor or a semiconductor, the substrates (spacers) 14 are desirably formed of an electrically insulating material to prevent the unexpected shorting, through the single-crystal substrate 3, of the wiring on the substrate (the base substrate of the optical elements) 16 to be bonded thereto. In the case where the Si wafer is used as a base material of the single-crystal substrate 3, using borosilicate glass (for example, PIREX (R) of Corning Inc. or TEMPAX Float (R) of Schott Inc.) having substantially the same thermal expansion coefficient as Si described in the first embodiment for the substrate 14, enables the substrate 14 to be bonded directly to the single-crystal substrate 3.

An example of the process of bonding the substrates 14 to the outer surface of the band pass filter part 15 (single-crystal substrate 3) is explained below. First, a resist pattern is formed by photolithography on the primary surface of a tabular member of borosilicate glass constituting the substrates 14. The resist pattern is formed in such a manner as to cover the unprocessed portion of the primary surface of a sheet member. Next, the primary surface of the sheet member formed with the resist pattern is sandblasted or etched thereby to form a through hole in the portion of the primary surface of the sheet member exposed by the resist opening. In this stage, the sheet member of borosilicate glass constituting the substrates 14 becomes a perforated plate formed with a plurality of openings like the honeycomb. The plurality of the openings each surrounds the optical elements mounted with a space with each other for each optical module on the primary surface of the base substrate 16 to be bonded to the substrates 14. The cross section of "a filter element array (an aggregate of the band pass filter parts 15 in the wafer state)" with the perforated plate of borosilicate glass bonded to the outer surface of the single-crystal substrate (or the wafer thereof) 3 is schematically shown in FIG. 9(a). Each pair of adjacent ones of the plurality of the substrates (spacers) 14 shown in discrete state in FIG. 9(a) are separated by and surrounds one of the plurality of the openings formed on "one perforated plate" described above.

On the other hand, as shown in FIG. 9(a), a group of optical elements (the light-emitting element 38 and a pair of the light-receiving elements 39, 40) corresponding to each optical module are formed discretely at a plurality of points on the primary surface of the substrate 16 in the wafer state. This substrate 16 is formed of an electrically insulating material or a semiconductor material, and the primary surface thereof is formed with a plurality of wiring (not shown) connected the optical elements, respectively. The substrate (perforated plate) 14 with the first primary surface thereof bonded to the outer surface of the filter element array (single-crystal substrate 3) has the second primary surface opposed to the first primary surface which is bonded to "the areas separating the optical elements from each other" on the primary surface of the substrate 16.

In the case where the substrate 14 is formed of a material having substantially the same thermal expansion coefficient as Si, the band pass filter parts 15 and the substrate 16 in the wafer state can be fixed by anodic bonding through the substrates 14. Assume, for example, that a voltage is applied between the single-crystal substrate (Si substrate) 2 as a cathode located on the side of the filter element array (the aggregate of the band pass filter parts 15) opposed to the substrate 16 and the substrate 16 as an anode. Then, the positive ions contained in the substrate 14 are diffused forcibly into the substrate 16 and the balance of electric charge in the substrate 14 is collapsed, thereby generating a strong electrostatic attractive force in the vicinity of the contact boundary between each substrate 14 and the substrate 16. This electrostatic attractive force closely attaches the substrates 14 (i.e. the aggregate of the band pass filter parts 15) and the substrate (the mounting substrate of the optical elements) 16 to each other, as shown in FIG. 9(b), thereby completing a plurality of optical modules on wafer level.

In the process of assembling the optical elements 38 to 40 into the band pass filter parts 15, on the other hand, the general characteristics of the optical elements of the LD 38 and PDs 39, 40 that they are weak in static electricity is required to be taken into consideration. As an example of the method to prevent an unexpected voltage from being applied between the electrodes of the optical elements 38 to 40, the primary surface of the substrate 16 in the wafer state is formed with a wiring (what may be called a common wiring) adapted to connect the electrodes of the optical elements mounted thereon. With this common wiring, the electric charge which may be generated by static electricity in the neighborhood of the electrode of a given optical element is dispersed into the primary surface of the substrate (wafer) 16, and the concentration of the electric charge on one optical element and the resulting destruction of the optical element are prevented. The substrate 16 in the wafer state is cut into a size corresponding to each single optical module in the process of separation into individual optical modules, for example, along cutting lines CL shown in FIG. 9(b). However, since the peripheral portion of the primary surface of the substrate 16 is generally discarded as scraps, it is better that the short circuit formed by the common wiring between the optical elements is patterned on the peripheral portion. By doing so, the peripheral portion of the primary surface of the substrate 16 is separated from the optical modules while at the same time electrically disconnecting the wiring formed on each optical module and the short circuit from each other. Incidentally, the wiring formed on the primary surface of the substrate 16, the metallized pattern for packaging the optical elements and the adhesive or bonding agents for the parts mounted with the optical elements are not shown in FIG. 5.

The plurality of the optical modules (aggregates) in the wafer state are individualized into each optical module as shown in FIG. 9(c) by cutting the substrates 1 to 3 (the band pass filter parts 15), the substrate 14 and the substrate 16 by dicing or the combination of "scribe" and "break" processes. In the shown optical module, a masking film 17 is formed on the outer surface of the single-crystal substrate 2 facing the optical fiber for transmitting the optical signal to the optical module, and an opening 17a is formed at the portion of the single-crystal substrate 2 near to the side 21b of the inclined surface 21. In this optical module, the opening 17a of the masking film 17 is arranged facing the optical fiber, so that the optical signal is transmitted to or received from the optical fiber through the opening 17a. The unexpected entrance of light from the optical fiber or its neighborhood into the single-crystal substrate 2 is blocked by the masking film 17, and therefore, the signal-to-noise ratio (S/N) for detection of the optical signal especially by the PDs (light-receiving elements) 39, 40 is improved.

The thin-film soldering or the flip-chip bonding is used to mount the optical elements 38 to 40 on the primary surface of the substrate 16. Although the die bonding of the optical elements on the substrate 16 using the thin-film soldering has been conventionally employed, the optical elements cannot be easily mounted on the primary surface of the substrate 16 in wafer level with a high yield and a high positional accuracy. In view of this, an example of the process suitable for mass production of the optical modules according to the invention is explained below, in which a plurality of optical elements corresponding to the optical modules are efficiently arranged on the primary surface of the substrate 16 in the wafer state.

First, the metalized pattern connected to the electrodes of the optical elements and a wiring are formed on the primary surface of the substrate 16. Next, the portions connected with the optical elements are formed with several μm thick solder by the lift-off method or the like. As this solder, the use of the gold-tin (Au—Sn) solder, or especially, the thin-film solder of a composition having the eutectic structure of Au and 20 wt % Sn improves the wettability against the electrodes of the optical elements. The optical elements are pressed against the thin-film solder without melting the solder and, while maintaining the thin-film solder in solid state, provisionally fixed on the primary surface of the substrate 16 in the wafer state by the metal diffusion into the electrodes of the optical elements or the deformation of the metal constituting the electrodes. Once the optical elements are provisionally fixed at predetermined positions dotted over the entire area of the primary surface of the wafer, the whole wafer is heated to the melting point of the thin-film solder or higher temperature, so that the electrodes of the optical elements are connected to the electrodes or the wiring on the primary surface of the wafer. The surface oxidization of the solder can be suppressed by heating the thin-film solder in the atmosphere of an inert gas such as nitrogen.

The optical elements, depending on the structure thereof, may be bonded by flip-chip bonding to the primary surface of the wafer constituting the substrate 16. For example, both an electrode (P electrode) arranged on the p-type semiconductor layer side and another electrode (N electrode) arranged on the n-type semiconductor layer side as viewed from the heterojunction constituting the light-emitting portion of the optical element preferably exist both on the surface thereof bonded to the primary surface of the wafer. The primary surface of the wafer constituting the substrate 16 is formed with a metallized pattern of the electrodes and the wiring in advance, and bumps of gold (Au), etc. are formed thereon. The electrodes of the optical elements are heated while being pressed against the Au bumps, and further, the ultrasonic wave is applied between the Au bumps and the electrodes of the optical elements thereby to promote the diffusion of the elements between the Au bumps and the electrodes of the optical elements and the deformation of the bumps and the electrodes, thereby making it possible to bond the bumps and the electrodes. This connection method can be carried out without melting the metal such as the bumps (the structure on the wafer) and the electrodes (optical elements) participating in the connection, and therefore, is suitable to the process for sequentially connecting the optical elements at a plurality of positions dispersed on the primary surfaces of the wafer.

According to the method of fabricating the optical module according to this embodiment, the optical elements 38 to 40 are mounted on the substrate 16 in the wafer state, and the band pass filter parts 15 are collectively bonded on the optical elements 38 to 40. In this way, a number of optical modules can be fabricated inexpensively with a high yield.

The filter element and the optical module having the filter element according to this invention are applicable especially to an optical communication system based on the wavelength division multiplexing scheme, and can detect each of a plurality of optical signals having different wavelength with a high accuracy and sensitivity without increasing the size of the transmission/reception unit thereof. Also, by fabricating a plurality of the optical modules at the same time on wafer level, a number of optical modules can be mass produced without repeating the fine adjustment of the positions of the optical elements on each optical module.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical module comprising:
a first single-crystal silicon substrate having a first primary surface formed with a first depression having a first inclined surface inclined with respect to the first primary surface;
a second single-crystal silicon substrate having a second primary surface facing the first silicon single-crystal substrate and formed with a second depression having a second inclined surface inclined with respect to the second primary surface; and
a first substrate arranged between the first primary surface of the first single-crystal silicon substrate and the second primary surface of the second single-crystal silicon substrate, two primary surfaces of the first substrate being bonded to the first primary surface of the first single-crystal silicon substrate and the second primary surface of the second single-crystal silicon substrate, respectively, the first substrate having an optical filter on the primary surfaces thereof between the first inclined surface and the second inclined surface;
wherein the first inclined surface and the second inclined surface are inclined with respect to the two primary surfaces of the first substrate, and light which enters the optical module passes through the first inclined surface, the first substrate and the second inclined surface, and then exits the optical module.

2. The optical module according to claim 1, further comprising a second substrate bonded to the first primary surface of the second single-crystal substrate opposed to the second primary surface of the second single-crystal substrate, and provided with at least one optical element on the surface thereof.

3. The optical module according to claim 1,
wherein the first and second inclined surfaces formed on each of the single-crystal silicon substrates are the crystal plane of the single-crystal silicon substrates.

4. The optical module according to claim 2,
wherein each of the first and second substrates is a glass substrate.

5. The optical module according to claim 2,
wherein the first and second substrates are bonded to the first and second single-crystal substrates, respectively, by a method selected from methods including anodic bonding, adhesive and solder.

6. The optical module according to claim 2, further comprising a transparent resin inserted between the second substrate and the optical element which transmits light and has a larger refractive index than that of air.

7. An optical module comprising:
a first single-crystal silicon substrate having a first primary surface formed with a first depression having a first inclined surface inclined with respect to the first primary surface;
a second single-crystal silicon substrate having a second primary surface facing the first silicon single-crystal substrate and formed with a second depression having a second inclined surface inclined with respect to the second primary surface;
a first substrate arranged between the first primary surface of the first single-crystal silicon substrate and the second primary surface of the second single-crystal silicon substrate, two primary surfaces of the first substrate being bonded to the first primary surface of the first single-crystal silicon substrate and the second primary surface of the second single-crystal silicon substrate, respectively, the first substrate having an optical filter on the primary surfaces thereof between the first inclined surface and the second inclined surface,
a second substrate bonded to the first primary surface of the second single-crystal substrate opposed to the second primary surface of the second single-crystal substrate, and provided with at least one optical element on the surface thereof; and
a transparent resin inserted between the second substrate and the optical element which transmits light and has a larger refractive index than that of air;
wherein the optical element is covered by a non-transmissive resin to shut off light.

8. An optical module comprising:
a first single-crystal silicon substrate having a first primary surface formed with a first depression having a first inclined surface inclined with respect to the first primary surface;
a second single-crystal silicon substrate having a second primary surface facing the first silicon single-crystal substrate and formed with a second depression having a second inclined surface inclined with respect to the second primary surface; and
a first substrate arranged between the first primary surface of the first single-crystal silicon substrate and the second primary surface of the second single-crystal silicon substrate, two primary surfaces of the first substrate being bonded to the first primary surface of the first single-crystal silicon substrate and the second primary surface of the second single-crystal silicon substrate, respectively, the first substrate having an optical filter on the primary surfaces thereof between the first inclined surface and the second inclined surface; and
a second substrate bonded to the first primary surface of the second single-crystal substrate opposed to the second primary surface of the second single-crystal substrate, and provided with at least one optical element on the surface thereof;
wherein the optical element is a light-receiving element,
light which enters the primary surface of the first single-crystal substrate opposed to the first primary surface thereof exits from the first inclined surface, the light which exits from the first single-crystal substrate is transmitted through or reflected on the optical filter on the first substrate, and the light transmitted through or reflected on the optical filter enters the second single-crystal substrate from the second inclined surface and reaches a light-receiving element through the second substrate.

9. The optical module according to claim 8, wherein the light is separated into at least two light rays having different wavelength when being transmitted through or reflected at the optical filter.

10. An optical module comprising:

a first single-crystal silicon substrate having a first primary surface formed with a first depression having a first inclined surface inclined with respect to the first primary surface;

a second single-crystal silicon substrate having a second primary surface facing the first silicon single-crystal substrate and formed with a second depression having a second inclined surface inclined with respect to the second primary surface; and a first substrate arranged between the first primary surface of the first single-crystal silicon substrate and the second primary surface of the second single-crystal silicon substrate, two primary surfaces of the first substrate being bonded to the first primary surface of the first single-crystal silicon substrate and the second primary surface of the second single-crystal silicon substrate, respectively, the first substrate having an optical filter on the primary surfaces thereof between the first inclined surface and the second inclined surface, wherein light emitted from a light-emitting element enters the optical module, passes through the first inclined surface, the first substrate and the second inclined surface, and then exits the optical module, and wherein the light emitted from the light-emitting element enters the primary surface of the second single-crystal substrate opposed to the second primary surface thereof and exits from the second inclined surface, the light which exits from the second inclined surface is transmitted through the optical filter, and the light transmitted through the optical filter enters the first single-crystal substrate from the first inclined surface and exits from the primary surface opposed to the first primary surface of the first single-crystal substrate.

11. An optical module comprising:

a first single-crystal silicon substrate having a first primary surface formed with a first depression having a first inclined surface inclined with respect to the first primary surface;

a second single-crystal silicon substrate having a second primary surface facing the first silicon single-crystal substrate and formed with a second depression having a second inclined surface inclined with respect to the second primary surface; and a first substrate arranged between the first primary surface of the first single-crystal silicon substrate and the second primary surface of the second single-crystal silicon substrate, two primary surfaces of the first substrate being bonded to the first primary surface of the first single-crystal silicon substrate and the second primary surface of the second single-crystal silicon substrate, respectively, the first substrate having an optical filter on the primary surfaces thereof between the first inclined surface and the second inclined surface, wherein the first inclined surface and the second inclined surface are inclined with respect to the two primary surfaces of the first substrate and are substantially parallel to each other, wherein light which enters the optical module passes through the first inclined surface, the first substrate and the second inclined surface, and then exits the optical module.

12. A method of fabricating an optical module, comprising a process of fabricating a filter element by bonding:

a first substrate having a first primary surface, a second primary surface opposed to the first primary surface, and provided with at least one optical filter on the first and second primary surfaces;

a first single-crystal silicon substrate bonded to the first primary surface of the first substrate and provided with a depression having an inclined surface formed on the primary surface thereof bonded to the first substrate; and a second single-crystal silicon substrate bonded to the second primary surface of the first substrate and provided with a depression having an inclined surface formed on the primary surface thereof bonded to the second primary surface of the first substrate;

wherein the inclined surface of the depression formed on the second single-crystal substrate is substantially parallel to the inclined surface of the depression formed on the first single-crystal substrate.

13. The method of fabricating an optical module according to claim 12, comprising steps of:

mounting a light-receiving element on a second substrate; and positioning the second substrate mounted with the light-receiving element with respect to the filter element by operating the light-receiving element, thereby bonding the second substrate to the filter element thus fabricated.

14. The method of fabricating an optical module according to claim 12, wherein the process of fabricating the filter element includes steps of:

arranging a plurality of the optical filters on the first and second primary surfaces of the first substrate in the wafer state;

forming a plurality of the depressions on the first and second single-crystal substrates in the wafer state;

positioning the depressions with respect to the optical filters of the first substrate and bonding the first and second single-crystal substrates to the two surfaces of the first substrate, respectively; and cutting the bonded first substrate, and the first and second single-crystal substrates per a pair of the depressions.

15. The method of fabricating an optical module according to claim 12, wherein the first and second inclined surfaces formed on each of the single-crystal silicon substrates is the crystal plane of the single-crystal silicon substrates.

16. The method of fabricating an optical module according to claim 13, wherein each of the first and second substrates is a glass substrate.

17. The method of fabricating an optical module according to claim 13, wherein the first and second substrates are bonded to the first and second single-crystal substrates by selected one of anodic bonding, adhesive and solder.

18. The method of fabricating an optical module according to claim 12, wherein the first and second inclined surfaces are substantially parallel to each other.

* * * * *